United States Patent
Nimura

(10) Patent No.: US 9,983,334 B2
(45) Date of Patent: May 29, 2018

(54) MICRO LENS ARRAY SUBSTRATE, ELECTRO-OPTICAL DEVICE, AND ELECTRONIC APPARATUS

(71) Applicant: Seiko Epson Corporation, Tokyo (JP)

(72) Inventor: Toru Nimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/795,004

(22) Filed: Oct. 26, 2017

(65) Prior Publication Data

US 2018/0045859 A1 Feb. 15, 2018

Related U.S. Application Data

(63) Continuation of application No. 15/336,138, filed on Oct. 27, 2016, now Pat. No. 9,829,608, which is a (Continued)

(30) Foreign Application Priority Data

Nov. 1, 2012 (JP) ................................ 2012-241574

(51) Int. Cl.
*G02F 1/1335* (2006.01)
*G02B 3/00* (2006.01)
(Continued)

(52) U.S. Cl.
CPC ......... *G02B 3/0043* (2013.01); *G02B 3/0056* (2013.01); *G02B 27/149* (2013.01);
(Continued)

(58) Field of Classification Search
CPC ......... G02F 1/133526; G02F 1/133512; G02F 1/136286; G02F 1/1368; G02F 2201/123;
(Continued)

(56) References Cited

U.S. PATENT DOCUMENTS 6,469,832 B2 * 10/2002 Yotsuya ............... G02B 3/0025
216/26
7,087,180 B2   8/2006 Kaise et al.
(Continued)

FOREIGN PATENT DOCUMENTS

JP   2001-021702 A   1/2001
JP   2004-258052 A   9/2004
(Continued)

OTHER PUBLICATIONS

Non-Final Office Action received in U.S. Appl. No. 14/049,872, dated Jun. 8, 2015.
(Continued)

*Primary Examiner* — Nathanael R Briggs
*Assistant Examiner* — William Peterson
(74) *Attorney, Agent, or Firm* — ALG Intellectual Property, LLC

(57) ABSTRACT

A micro lens array substrate includes a substrate including a plurality of concave portions arranged in a first direction and a second direction intersecting the first direction on one surface of the substrate, and a lens layer having a different refractive index from the substrate. The lens layer is formed on the one surface of the substrate to fill in the plurality of concave portions. The plurality of concave portions is continuous in at least one of the first direction and the second direction and is arranged to have a discontinuous part in the lens layer between two adjacent concave portions in a third direction intersecting the first and second directions. A first depth of a center of one concave portion from the discontinuous part is greater than a second depth of the discontinuous part from a surface of the lens layer.

9 Claims, 16 Drawing Sheets

Related U.S. Application Data continuation of application No. 14/049,872, filed on Oct. 9, 2013, now Pat. No. 9,500,900.

(51) Int. Cl.
| | |
|---|---|
| *G02B 27/14* | (2006.01) |
| *G03B 33/12* | (2006.01) |
| *G02F 1/1362* | (2006.01) |
| *G02F 1/1368* | (2006.01) |
| *G03B 21/00* | (2006.01) |

(52) U.S. Cl.
CPC ...... *G02F 1/133526* (2013.01); *G02F 1/1368* (2013.01); *G02F 1/133512* (2013.01); *G02F 1/136286* (2013.01); *G02F 2001/133565* (2013.01); *G02F 2001/133607* (2013.01); *G02F 2201/123* (2013.01); *G03B 21/006* (2013.01); *G03B 33/12* (2013.01)

(58) Field of Classification Search
CPC ........ G02F 2001/133607; G02F 2001/133565; G02B 3/0043; G02B 3/0056; G02B 27/149; G03B 33/12; G03B 21/006
USPC .......................................................... 349/95
See application file for complete search history.

(56) References Cited

U.S. PATENT DOCUMENTS

| | | |
|---|---|---|
| 2006/0215269 A1 | 9/2006 | Abe et al. |
| 2007/0132960 A1 | 6/2007 | Terao et al. |
| 2009/0121989 A1 | 5/2009 | Namose |
| 2009/0244713 A1 | 10/2009 | Kodera et al. |
| 2011/0109818 A1 | 5/2011 | Uneda et al. |

FOREIGN PATENT DOCUMENTS

| | | |
|---|---|---|
| JP | 2009-271468 A | 11/2009 |
| JP | 2011-059230 A | 3/2011 |
| JP | 2011-118324 A | 6/2011 |

OTHER PUBLICATIONS

Final Office Action received in U.S. Appl. No. 14/049,872, dated Dec. 11, 2015.

Notice of Allowance and Notice of Allowability received in U.S. Appl. No. 14/049,872, dated Jul. 22, 2016.

Non-Final Office Action received in U.S. Appl. No. 15/336,138, dated Apr. 11, 2017.

Notice of Allowance and Notice of Allowability received in U.S. Appl. No. 15/336,138, dated Jul. 28, 2017.

* cited by examiner

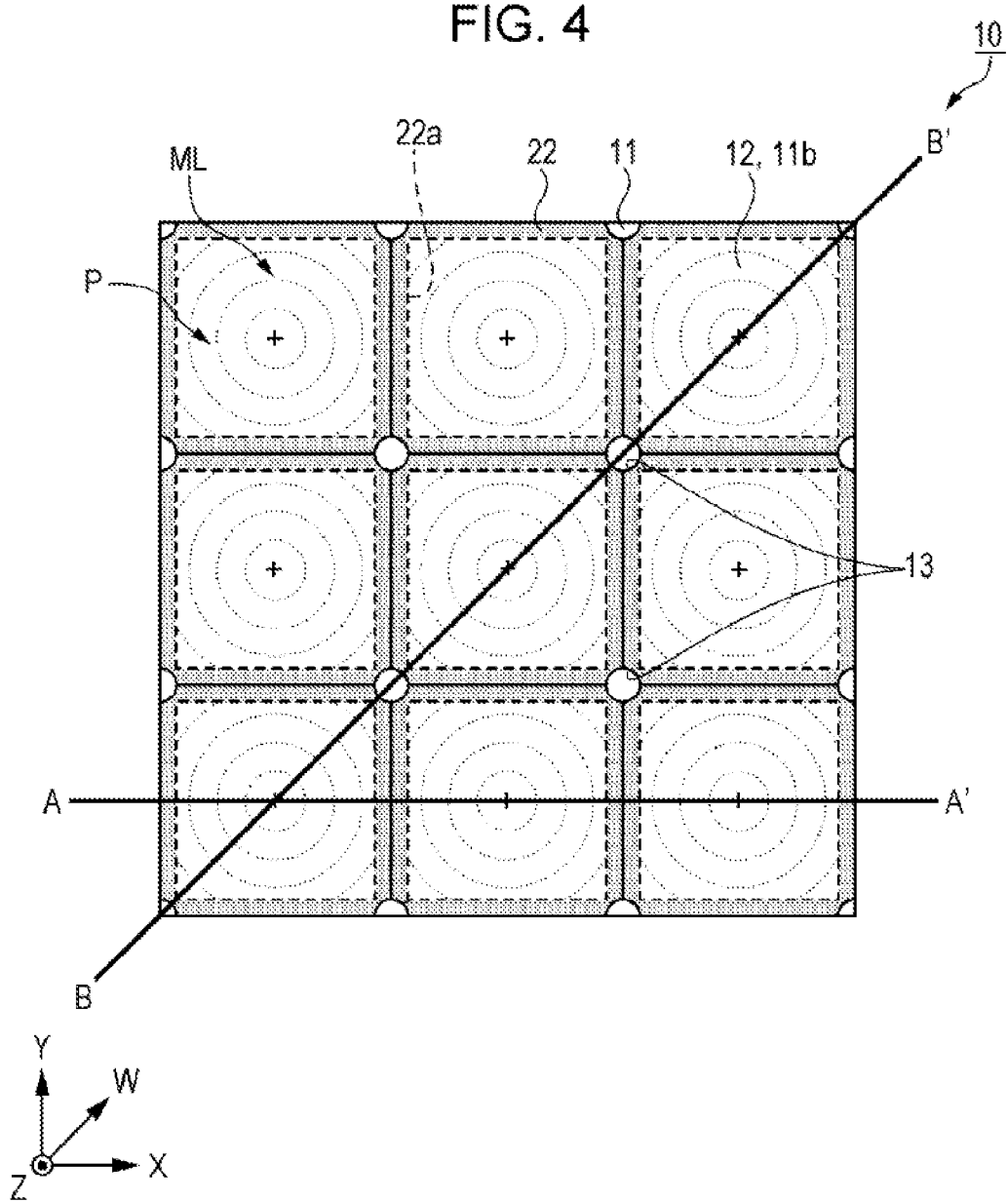

MICRO LENS ARRAY SUBSTRATE, ELECTRO-OPTICAL DEVICE, AND ELECTRONIC APPARATUS

The present application is a continuation application of U.S. patent application Ser. No. 15/336,138 filed Oct. 27, 2016, which is a continuation application of U.S. patent application Ser. No. 14/049,872 filed on Oct. 9, 2013 (now U.S. Pat. No. 9,500,900), which claims priority from Japanese Patent Application No. 2012-241574 filed Nov. 1, 2012, each of which are expressly incorporated by reference herein.

BACKGROUND

1. Technical Field

The present invention relates to a micro lens array substrate, a method of manufacturing the micro lens array substrate, an electro-optical device and an electronic apparatus.

2. Related Art

An electro-optical device has been known that is equipped with an electro-optic material (for example, liquid crystal and the like) between an element substrate and an opposite substrate. A liquid crystal device used as a liquid crystal light valve of a projector can be among examples of the electro-optical device. An attempt has been made to realize high efficiency of utilization of light for such a liquid crystal device.

Incidentally, for example, a configuration has been known in which at least one of the element substrate and the opposite substrate of the liquid crystal device includes the micro lens array substrate and thus light incident on the liquid crystal device is gathered. The configuration accomplishes a substantial improvement on an aperture rate of the liquid crystal device. The micro lens array substrate includes a base material (substrate) made from quartz or the like, on whose surface multiple concave portions are formed, and a lens layer having a different refractive index from that of the base material, which is formed in such a manner as to fill in a concave portion covering the material (for example, refer to JP-A-2011-118324).

Incidentally, if in the element substrate including the micro lens array substrate, a TFT element is formed after forming the micro lens array substrate, the micro lens array substrate is exposed to temperature changes, such as high temperature heating or cooling at the time of high temperature heating processing in a process of forming the TFT element. Then, a stress, which results from a difference in thermal expansion coefficient between the material and the lens layer, a change in composition of the lens layer, or the like, is applied to the lens layer. This causes a problem in that a crack propagates into the lens layer.

In contrast, like the configuration of the liquid crystal display element (electro-optical device) disclosed in JP-A-2011-118324, a configuration has been proposed in which the stress being applied to the lens layer is distributed and alleviated by separating the lens layer on the micro lens array substrate between lenses. However, according to the configuration of the liquid crystal display element disclosed in JP-A-2011-118324, because the adjacent lenses are arranged with spacing in between, light incident on a space between the lenses is not gathered by the lens. This causes a concern that the efficiency of utilization of light will be decreased. Therefore, the crack in the lens layer can be prevented, and additionally, the micro lens array substrate has been required that is capable of improving the efficiency of utilization of light.

SUMMARY

The invention can be realized in the following forms or application examples.

Application Example 1

According to this application example, there is provided a micro lens array substrate including a substrate having optical transparency, in whose one surface a concave portion arranged in a first direction, in a second direction intersecting the first direction, and in a third direction intersecting the first direction and the second direction is formed, and a lens layer having optical transparency and having a different refractive index from that of the substrate, which is formed on the one surface of the substrate in such a manner as to fill in the concave portion and to cover a region where the concave portion is formed, in which on the lens layer, a discontinuous part is formed between the adjacent concave portions in the third direction among the first direction, the second direction, and the third direction when viewed from above, in which the lens layer is continuous between the adjacent concave portions in at least one of the first direction and the second direction.

In this case, a stress being applied to the lens layer is distributed because the discontinuous part is provided between the adjacent concave portions in the third direction among the first direction, the second direction and the third direction in the lens layer that is formed in such a manner as to fill in the concave portion in the substrate and to cover the region where the concave portion is formed. Furthermore, because a volume of the entire lens layer is decreased by as much as a space occupied by the discontinuous part, the stress being applied to the lens layer is alleviated. On the other hand, because the lens layer is continuous between the adjacent concave portions in at least one of the first direction and the second direction and light incident on a space between the micro lenses is gathered by the micro lens and thus is utilized, the efficiency of utilization of light is improved, compared to a case where the micro lenses are arranged with spacing in between. Because of this, the crack in the lens layer is suppressed, and additionally, the micro lens array substrate capable of improving the efficiency of utilization of light can be provided.

Application Example 2

In the micro lens array substrate according to the application example, the concave portions may be partitioned into the shape of a lattice along the first and the second directions, the third direction may be a direction in which intersection points on the lattice are diagonally linked together, and the discontinuous part may be provided in a position that corresponds to the intersection point on the lattice.

In this case, because the concave portions in the substrate are partitioned into the shape of a lattice along the first direction and the second direction and the discontinuous part in the lens layer is provided in the position that corresponds to the intersection point on the lattice, the stress being applied to the lens can be distributed over the adjacent micro lenses in the third direction that is the direction in which the intersection points on the lattice are diagonally linked together. Furthermore, because the lens layer is continuous in positions other than the position that corresponds to the intersection point on the lattice, the efficiency of utilization of light can be improved.

Application Example 3

The micro lens array substrate according to the application example may further include a transistor having a channel region, which is provided to every pixel, opposite to the substrate on which the lens layer is formed, and a light blocking layer that is provided between the lens layer and the transistor in such a manner as to overlap at least the channel region of the transistor when viewed from above, in which the discontinuous part may be provided in a region that overlaps the light blocking layer when viewed from above.

In this case, because the micro lens array substrate includes the transistor provided in every pixel, the micro lens array substrate can be said to be the element substrate equipped with the micro lens array substrate. Because in the element substrate, the light blocking layer is provided in the region that overlaps the channel region of the transistor that needs the light blocking and the discontinuous part is provided in the region that overlaps the light blocking layer above the lens layer, light that is not utilized can be more decreased.

Application Example 4

In the micro lens array substrate according to the application example, the lens layer may have a through-hole, as the discontinuous part, which extends to the substrate.

In this case, the stress being applied to the lens layer can be distributed over the through-hole that extends to the substrate. Furthermore, because a volume of the entire lens layer is decreased by as much as a space occupied by the through-hole, the stress being applied to the lens layer can be alleviated.

Application Example 5

In the micro lens array substrate according to the application example, the lens layer may include a groove portion that is formed between the concave portions along at least one of the first direction and the second direction when viewed from above and that has a depth extending to the substrate between the adjacent concave portions in the third direction, and the discontinuous part may be a part extending to the substrate in the groove portion.

In this case, the stress being applied to the lens layer can be distributed over the part that has the depth extending to the substrate in the groove portion. Furthermore, because the volume of the entire lens layer is decreased by as much as a space occupied by the groove portion, the stress being applied to the lens layer can be alleviated. Because in parts other than the part that extends to the substrate, the lens layer is continuous also in the part in which the groove portion is formed, light incident on the groove portion also can be effectively utilized.

Application Example 6

The micro lens array substrate according to the application example may further include a transparent layer having optical transparency, almost the same refractive index as the lens layer, and higher heat resistance than the lens layer, which is formed in such a manner as to fill in the discontinuous part in the lens layer.

In this case, because the transparent layer is formed in such a manner as to fill in the discontinuous part in the lens layer, a height difference of a surface of the lens layer due to the discontinuous part is alleviated. Accordingly, if the light blocking layer or a wiring line is formed on a layer above the lens layer, the light blocking layer or the wiring line can be formed in a state where the light blocking layer or the wiring line is stabilized. Furthermore, because the transparent layer has optical transparency and has almost the same refractive index as the lens layer, unnecessary reflection or scattering of light on an interface of the discontinuous part is suppressed. This can suppress a decrease in transmittance of incident light. Moreover, because the transparent layer has higher heat resistance than the lens layer, although the micro lens array substrate is exposed to temperature changes, such as high temperature heating or cooling, the crack in the lens layer can be more suppressed.

Application Example 7

According to this application example, there is provided an electro-optical device including the micro lens array substrate according to Application Examples described above.

In this case, the electro-optical device is equipped with the micro lens array substrate that suppresses the crack in the lens layer and additionally improves the efficiency of utilization of light. This makes it possible to provide the liquid crystal device that is high in quality and is bright in display.

Application Example 8

According to this application example, there is provided an electronic apparatus including the electro-optical device according to the application example.

In this case, the electronic apparatus can be provided that includes the electro-optical device which is high in quality and is bright in display.

Application Example 9

According to this application example, there is provided a method of manufacturing a micro lens array substrate, including forming concave portions that are partitioned into the shape of a lattice along a first direction, and a second direction intersecting the first direction on one surface of a substrate having optical transparency, forming a lens layer having optical transparency and having a different refractive index from that of the substrate on the one surface of the substrate in such a manner as to fill in the concave portion and to cover a region where the concave portion is formed, and stripping off one part of the lens layer and forming a portion in which the substrate is exposed, on a position that overlaps four corners of each of the regions that are partitioned in the shape of a lattice when viewed from above.

In this case, the concave portions that are partitioned into the shape of a lattice are formed on the one surface of the substrate and the lens layer is formed in such a manner as to fill in the concave portions in the one surface of the substrate and to cover the region where the concave portions are formed. Thereafter, the part in which the substrate is exposed is formed in the position that overlaps the four corners of the each of the regions that are partitioned in the shape of a lattice, by stripping off the one part of the lens layer. For this reason because the part of the lens layer, in which the substrate is exposed, is a discontinuous part, the stress applied to the lens layer is distributed. Furthermore, because the volume of the entire lens layer is decreased by as much as a space occupied by the stripped-off one part, the stress being applied to the lens layer can be alleviated. On the other hand, because in positions other than the positions that correspond to the four corners of each of the regions that are partitioned into the shape of a lattice, the lens layer is continuous and light that enters a space between the micro lenses is gathered by the micro lens and thus is utilized, the efficiency of utilization of light can be improved. Because of this, the crack in the lens layer is suppressed, and additionally, the micro lens array substrate capable of improving the efficiency of utilization of light can be manufactured.

Application Example 10

The method of manufacturing a micro lens array substrate according to the application example may further include, forming a light blocking layer on the lens layer between the forming of the lens layer and the stripping-off of the one part of the lens layer and the forming of the portion, in which in the forming of the light blocking layer, the light blocking layer in the shape of a lattice may be formed in a position that overlaps a border between the concave portions when viewed from above, and in which in the stripping-off of the one part of the lens layer and the forming of the portion, a part of the lens layer, which is not covered with the light blocking layer, may be stripped off until the substrate is exposed at a border between the part not covered and a part covered with the light blocking layer in the lens layer, along the thickness direction from the side of the light blocking layer.

In this case, because after forming the lens layer and forming the light blocking layer in the shape of a lattice on the lens layer, the part not covered with the light blocking layer is stripped off along the thickness direction from the side of the light blocking layer, the lens layer can be etched using the light blocking layer as an etching mask. Because this can make the mask for etching the lens layer unnecessary, a photolithography process of forming the mask for etching the lens layer can be reduced. Furthermore, the etching of the lens layer with the light blocking layer as the etching mask suppresses a positional deviation between the discontinuous part in the lens layer, in which the substrate is exposed, and the light blocking layer above the micro lens. This can suppress a decrease in the efficiency of utilization of light that results from the mutual positional deviation between the micro lens and the light blocking layer.

Application Example 11

The method of manufacturing a micro lens array substrate according to the application example may further include forming a transparent layer in such a manner as to fill in the stripped-off part in the lens layer, after the stripping-off of the one part of the lens layer and the forming of the portion, in which the transparent layer may have optical transparency, almost the same refractive index as the lens layer, and higher heat resistance than the lens layer.

In this case, because the transparent layer is formed in such a manner as to fill in the discontinuous part in the lens layer, a height difference of the surface of the lens layer due to the discontinuous part is alleviated. Thus, if the light blocking layer or the wiring line is formed on a layer on the lens layer in a state that the light blocking layer or the wiring line is stabilized. Furthermore, because the transparent layer has optical transparency and has almost the same refractive index as the lens layer, unnecessary reflection or scattering of light on an interface of the discontinuous part is suppressed. This can suppress a decrease in transmittance of incident light. Moreover, because the transparent layer has higher heat resistance than the lens layer, although the micro lens array substrate is exposed to temperature changes, such as high temperature heating or cooling, the crack in the lens layer can be more suppressed.

BRIEF DESCRIPTION OF THE DRAWINGS

The invention will be described with reference to the accompanying drawings, wherein like numbers reference like elements.

FIG. 4 is a schematic plan view illustrating a configuration of a micro lens array substrate according to the first embodiment.

DESCRIPTION OF EXEMPLARY EMBODIMENTS

Figure 1:
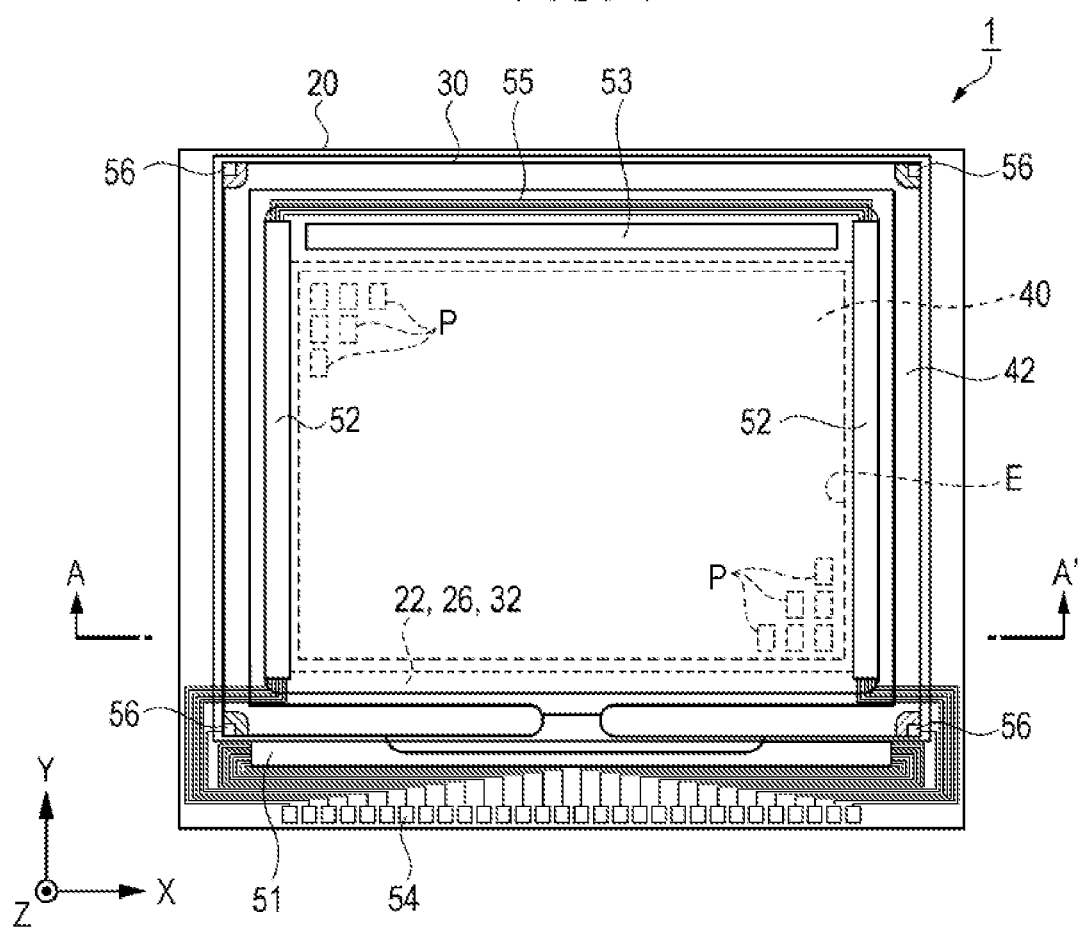
FIG. 1 is a schematic plan view illustrating a configuration of a liquid crystal device according to a first embodiment.

Embodiments that realize the present invention are described below referring to the drawings. The drawings referred to illustrate portions to be described in a properly-enlarged, reduced, or excessively-enlarged state so that they are made recognizable. Furthermore, there are cases where illustrations of constituent elements other than those necessary for descriptions of the embodiments are omitted.

In addition, according to the embodiments described below, for example, a case where a description "on the substrate" is provided is defined to mean that a given constituent component is arranged on the substrate in such a manner as to come into contact with the substrate, or that the given constituent component is arranged on the substrate with another constituent component in between, or that one part of the given constituent component is arranged on the substrate in such a manner as to come into contact with the substrate, and another part of the given constituent component is arranged on the substrate with another component in between.

First Embodiment

Electro-Optical Device

As an example, an active matrix type liquid crystal device, as an electro-optical device, equipped with a thin film transistor (TFT) as a switching element of a pixel, is described. The liquid crystal device can be suitably used, for example, as a light modulation element (a liquid crystal light valve) of a projection type display apparatus (a projector) described below.

Figure 2:
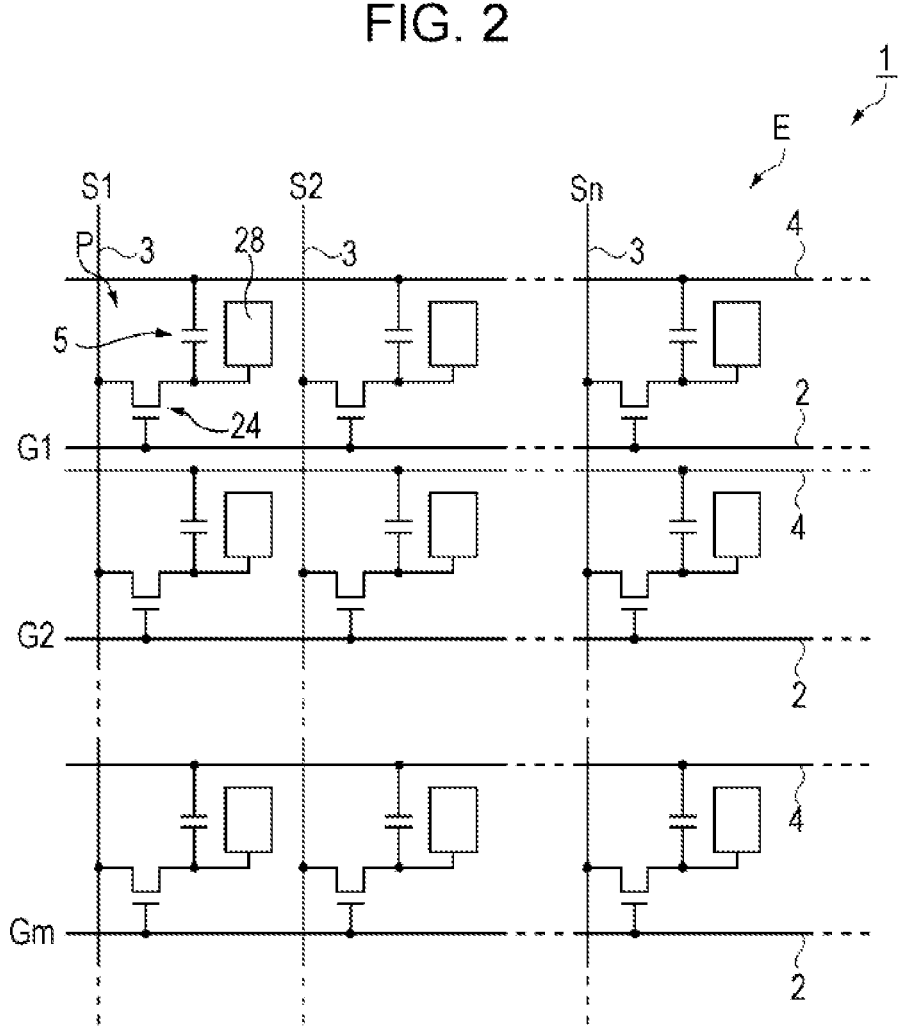
FIG. 2 is an equivalent circuit diagram illustrating an electric configuration of the liquid crystal device according to the first embodiment.
Figure 3:
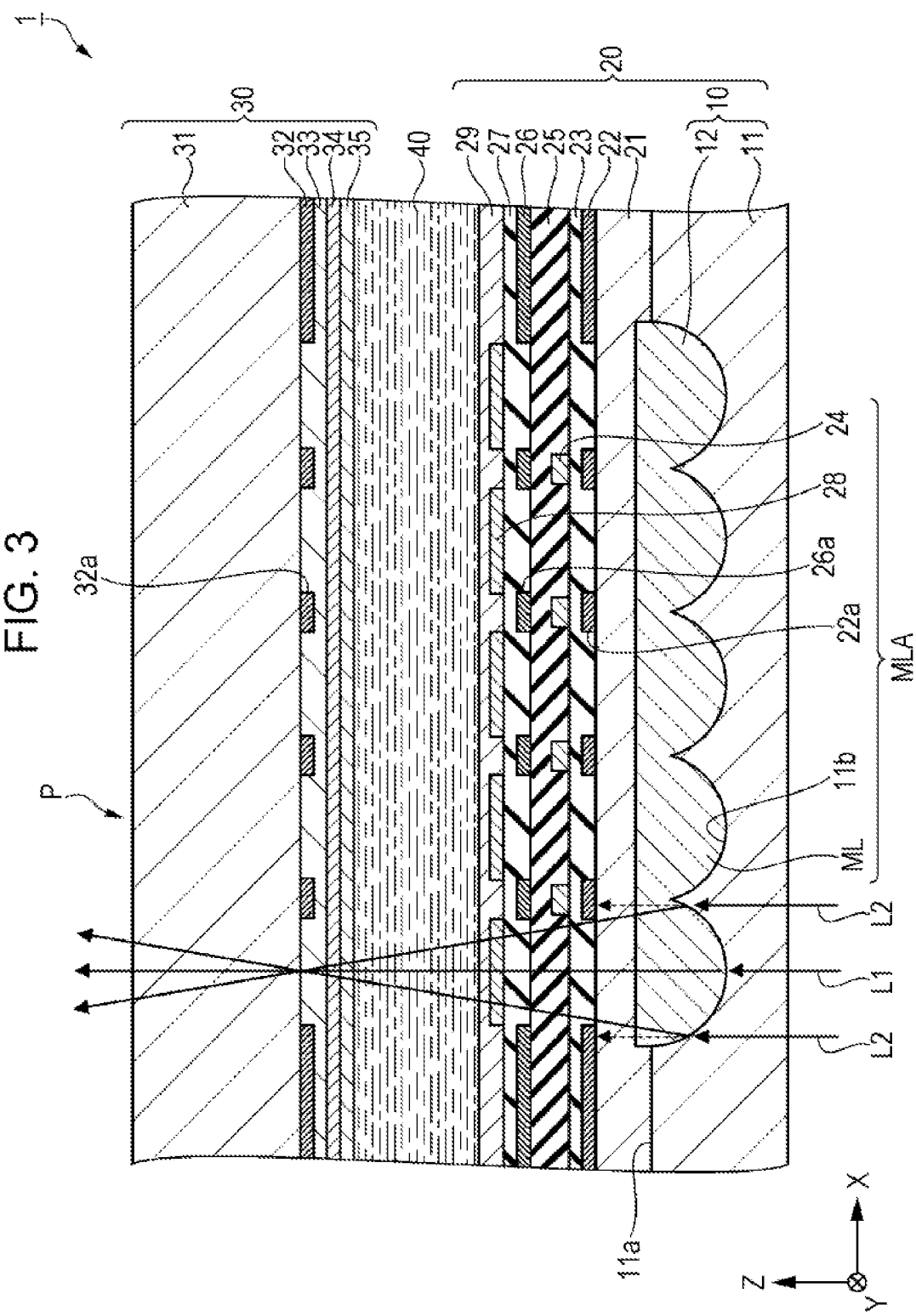
FIG. 3 is a schematic cross-sectional view illustrating the configuration of the liquid crystal device according to the first embodiment.

First, the liquid crystal device as the electro-optical device according to a first embodiment is described referring to FIG. 1, FIG. 2 and FIG. 3. FIG. 1 is a schematic plan view illustrating a configuration of the liquid crystal device according to the first embodiment. FIG. 2 is an equivalent circuit diagram illustrating an electric configuration of the liquid crystal device according to the first embodiment. FIG. 3 is a schematic cross-sectional view illustrating a configuration of the liquid crystal device according to the first embodiment. Specifically, FIG. 3 is a schematic cross-sectional view, taken along a line A-A' in FIG. 1.

As illustrated in FIG. 1 and FIG. 3, a liquid crystal device 1 according to the first embodiment, has an element substrate 20 and an opposite substrate 30 that are arranged opposite to each other, and a liquid crystal layer 40 interposed between the element substrate 20 and the opposite substrate 30. As illustrated in FIG. 1, the element substrate 20 is greater by one size than the opposite substrate 30, and both of the substrates are attached to each other with a sealant 42 arranged in the shape of a frame in between.

The liquid crystal layer 40 is configured from liquid crystal that is enclosed within a space surrounded by the element substrate 20, the opposite substrate 30, and the sealant 42 and has positive or negative dielectric anisotropy. For example, the sealant 42 is made from an adhesive agent such as a heat-cured or ultraviolet-cured epoxy resin. A spacer (an illustration thereof is omitted) for uniformly maintaining spacing between the element substrate 20 and the opposite substrate 30 is mixed into the sealant 42.

A light blocking layer 22 (26 and 32) having an edge portion in the shape of a frame is provided inside of the sealant 42 arranged in the shape of a frame. For example, the light blocking layer 22 (26 and 32) is made from light blocking metal or metallic oxide. The inside of the light blocking layer 22 (26 and 32) serves as a display region E on which multiple pixels P are arranged. The pixels P in an almost-rectangular shape are arranged into the shape of a matrix. The light blocking layer 22 (26 and 32) is provided in the display region E, for example, in the shape of a lattice, in such a manner as to planarly partition the multiple pixels P (refer to FIG. 4).

A data line drive circuit 51 and multiple external connection terminals 54 are provided outside of the sealant 42 on one edge portion of the element substrate 20, along one edge portion. Furthermore, an inspection circuit 53 is provided inside of the sealant 42 along one edge portion opposite to such one edge portion. Furthermore, a scan line drive circuit 52 is provided inside of the sealant 42 along the other two edge portions facing toward each other, which are at right angles to the two edge portions described above.

Multiple wiring lines 55 linking two of the scan line drive circuits 52 together are provided inside of the sealant 42 on one edge portion on which the inspection circuit 53 is provided. The wiring line linked to the data line drive circuit 51 and the scan line drive circuit 52 is connected to the multiple external connection terminals 54. Furthermore, upper and lower conduction portions 56 for flowing electric current between the element substrate 20 and the opposite substrate 30 are provided on corner portions of the opposite substrate 30. Moreover, the inspection circuit 53 is not limited to this arrangement, and may be provided in a position along the inside of the sealant 42 between the data line drive circuit 51 and the display region E.

In the following description, a direction along one edge portion on which the data line drive circuit 51 is provided is defined as the X-direction, which is a first direction, and a direction along the other two edge portions facing toward each other, which are at right angles to such one edge portion, is defined as the Y-direction as a second direction. The X-direction is a direction along an A-A' line in FIG. 1. Furthermore, a direction at right angles to the X-direction and the Y-direction, which faces upward in FIG. 1, is defined as the Z-direction. Moreover, in the present specification, a view from a normal direction (Z-direction) with respect to a surface of the liquid crystal device 1, which faces toward the opposite substrate 30, is defined as a "view from above."

As illustrated in FIG. 2, in the display region E, scan lines 2 and data lines 3 are formed in such a manner as to intersect each other, and the pixels P are provided corresponding to intersections between the scan lines 2 and the data lines 3. A pixel electrode 28 and a thin film transistor (TFT) 24 as the switching element are provided in each of the pixels P.

A source electrode (not illustrated) of the TFT 24 is electrically connected to the data line 3 extending from the data line drive circuit 51. Image signals (data signals) S1, S2, and so forth up to Sn are supplied from the data line drive circuit 51 (refer to FIG. 1) to the data line 3, in a line sequential order. A gate electrode (not illustrated) of the TFT 24 is one part of the scan line 2 extending from the scan line drive circuit 52. Scan signals G1, G2, and so forth up to Gm are supplied from the scan line drive circuit 52 to the scan line 2, in a line sequential order. A drain electrode (not illustrated) of the TFT 24 is electrically connected to the pixel electrode 28.

The image signals S1, S2, and so forth up to Sn are written into the pixel electrode 28 through the data line 3 at a predetermined timing by making the TFT 24 in an ON state only for a given period of time. The image signal at a predetermined level, which is written to a liquid crystal layer 40 through the pixel electrode 28 in this manner is retained for a given period time in a liquid crystal capacitor formed between the liquid crystal layer 40 and a common electrode 34 (refer to FIG. 3) provided to the opposite substrate 30.

Moreover, in order to prevent the image signals S1, S2, and so forth up to Sn from leaking, a storage capacitor 5 is formed between a capacitance line 4 formed along the scan line 2 and the pixel electrode 28 and is arranged in parallel with the liquid crystal capacitor. When a voltage signal is applied to liquid crystal in each pixel P in this manner, an orientation state of the liquid crystal changes by a level of applied voltage. Because of this, light incident on the liquid crystal layer 40 (refer to FIG. 3) is modulated, and thus gradation display is made possible.

Orientation and regularity of molecular association are changed by the level of an applied voltage. Thus, the liquid crystal making up the liquid crystal layer 40 modulates light and the gradation display is made possible. For example, in a case of a normally white mode, transmissivity with respect to incident light is decreased depending on the voltage applied in a unit of each pixel P. In a case of a normally black mode, the transmissivity with respect to the incident light is increased depending on the voltage applied in a unit of each pixel P, and light with contrast that depends on the image signal is emitted from the liquid crystal device 1 as a whole.

As illustrated in FIG. 3, the element substrate 20 includes a micro lens array substrate 10, a pass layer 21, the light blocking layer 22, an insulating layer 23, the TFT 24, an insulating layer 25, a light blocking layer 26, an insulating layer 27 and the pixel electrode 28 and an orientation film 29.

The micro lens array substrate 10 includes a substrate 11 and a lens layer 12. The substrate 11 has multiple concave portions 11b that are formed on one surface 11a of the substrate 11, which faces toward the liquid crystal layer 40. Each concave portion 11b is provided corresponding to each pixel P. The concave portion 11b is formed in the shape of a curved surface that tapers towards its bottom. For example, the substrate 11 is made from material having optical transparency such as glass or quartz.

The lens layer 12 is formed in such a manner as to cover one surface 11a of the substrate 11 and fill in the concave portion 11b. The lens layer 12 is made from material that has optical transparency and is different in refractive index from the substrate 11. More specifically, the lens layer 12 is made from inorganic material that is higher in optical refractive index than the substrate 11. An example of such inorganic material includes SiON and AlO.

A convex micro lens ML is made up by the concave portion 11b being filled in with the lens layer 12. Therefore, each micro lens ML is provided corresponding to each pixel P. Furthermore, a micro lens array MLA is made up by the multiple micro lens ML. It is preferable that the lens layer 12 be not provided outside of a region where micro lens array MLA is made up. That is, it is preferable that the lens layer 12 is provided in only a region where the concave portion 11b is formed, on one surface 11a of the substrate 11.

Moreover, a through-hole 13 as a discontinuous part is provided between the micro lenses ML along a predetermined direction (W-direction) in the lens layer 12 (refer to FIG. 4). The details of the micro lens array substrate 10 is described below such as an arrangement or a shape of the through-hole 13.

The pass layer 21 is provided in such a manner as to cover the micro lens array substrate 10. For example, the pass layer 21 is made from inorganic material that has approximately the same refractive index as the substrate 11. The pass layer 21 flattens a surface of micro lens array substrate 10 and has a function of adjusting a distance from the micro lens ML to the light blocking layer 22 to a desired value. Therefore, a layer thickness of the pass layer 21 is properly set, based on an optical condition such as a focal distance of the micro lens ML that depends on a wavelength of light.

The light blocking layer 22 is provided on the pass layer 21. The light blocking layer 22 is formed in the shape of a lattice in such a manner as to overlap the light blocking layer 26 positioned over the light blocking layer 22 when viewed from above (refer to FIG. 4). The light blocking layer 22 and the light blocking layer 26 are arranged in such a manner as to interpose the TFT 24 between them along the thickness direction (in the Z-direction) of the element substrate 20. The light blocking layer 22 overlaps at least a channel region of the TFT 24 when viewed from above. The providing of the light blocking layer 22 and the light blocking layer 26 suppress light entering the TFT 24. A region (within an opening portion 22a) surrounded by the light blocking layer 22 and a region (within an opening portion 26a) by the light blocking layer 26 are regions that allow light to pass through.

The insulating layer 23 is provided in such a manner as to cover the pass layer 21 and the light blocking layer 22. The insulating layer 23 is made from inorganic material such as $SiO_2$.

The TFT 24 is provided on the insulating layer 23. The TFT 24 is the switching element that drives the pixel electrode 28. The TFT 24 is configured from a semiconductor layer not illustrated, the gate electrode, the source electrode, and the drain electrode. A source region, a channel region and a drain region are formed on the semiconductor layer. A lightly doped drain (LDD) region may be formed at the interface between the channel region and the source region or between the channel region and the drain region.

The gate electrode is formed in a region that overlaps the channel region of the semiconductor layer in the element substrate 20 when viewed from above, with one part (gate insulating film) of the insulating layer 25 in between. Although its illustration is omitted, the gate electrode is electrically connected to the scan line 2 (refer to FIG. 2) arranged under the gate electrode with a contact hall in between and on/off-controls the TFT 24 by applying the scan signal.

The insulating layer 25 is provided in such a manner as to cover the insulating layer 23 and the TFT 24. The insulating layer 25 is made from inorganic material such as $SiO_2$. The insulating layer 25 includes the gate insulating film that insulates the semiconductor layer and the gate electrode of the TFT 24. The insulating layer 25 alleviates surface irregularity that results from the TFT 24. The light blocking layer 26 is provided on the insulating layer 25. Then, the insulating layer 27, made from inorganic material, is provided in such a manner as to cover the insulating layer 25 and the light blocking layer 26.

The pixel electrode 28 is provided on the insulating layer 27, corresponding to the pixel P. The pixel electrode 28 is arranged in a region that overlaps the opening portion 22a of the light blocking layer 22 and the opening portion 26a of the light blocking layer 26 when viewed from above. For example, the pixel electrode 28 is made from a transparent conductive film such as indium tin oxide (ITO) or indium zinc oxide (IZO). The orientation film 29 is provided in such a manner as to cover the pixel electrode 28.

Moreover, the TFT 24, and the electrode, the wiring line, or the like (not illustrated) through which an electric signal is supplied to the TFT 24 are provided in a region that overlaps the light blocking layer 22 and the light blocking layer 26 when viewed from above. A configuration may be provided in which the electrode, the wiring line, or the like serves also as the light blocking layer 22 and the light blocking layer 26.

The opposite substrate 30 includes a substrate 31, a light blocking layer 32, a protective layer 33, a common electrode 34, and an orientation film 35. For example, the substrate 31 is made from material having optical transparency, such as glass or quartz. The light blocking layer 32 is formed in the shape of a lattice in such a manner as to overlap the light blocking layer 22 and the light blocking layer 26 of the element substrate when viewed from above. A region (an opening portion 32a) surrounded by the light blocking layer 32 becomes a region that allows light to pass through.

The protective layer 33 is provided in such a manner as to cover the substrate 31 and the light blocking layer 32. The common electrode 34 is provided in such a manner as to the protective layer 33. The common electrode 34 is formed in such a manner as to straddle the multiple pixels P. For example, the common electrode 34 is made from a transparent conductive film such as indium tin oxide (ITO) or indium zinc oxide (IZO). The orientation film 35 is provided in such a manner as to cover the common electrode 34.

Moreover, the protective layer 33 covers the light blocking layer 32 in such a manner as to flatten a surface facing the liquid crystal layer 40 of the common electrode 34, but this is not an essential constituent element. For example, the common electrode 34 may be formed in such a manner as to cover directly the light blocking layer 32 having conductivity. The liquid crystal layer 40 is enclosed between the orientation film 29 to the side of the element substrate 20 and the orientation film 35 to the side of the opposite substrate 30.

In the liquid crystal device 1 according to the first embodiment, light enters the side of the element substrate 20 (substrate 11) equipped with the micro lens ML and is gathered by the micro lens ML. For example, among light incident on the convex micro lens ML from the side of the substrate 11, incident light L1 that enters along an optical axis that passes through a planar center of the pixel P propagates straight through the micro lens ML as it is, passes through the liquid crystal layer 40, and then propagates to the side of the opposite substrate 30.

Incident light L2 that is incident on an edge portion of the micro lens ML from a region that overlaps the light blocking layer 22 when viewed from above in a more outward direction than is the case with the incident light L1, if it propagates straight as it is, is blocked by the light blocking layer 22 as indicated by dashed lines, but is reflected to the planar center of the pixel P due to a difference in optical refractive index between the substrate 11 and the lens layer 12. In the liquid crystal device 1, the incident light L2 that, if it propagates straight in this manner, also is blocked by the light blocking layer 22 enters the opening portion 22a in the light blocking layer 22 because of a light collecting operation by the micro lens ML and thus can pass through the liquid crystal layer 40. As a result, because an amount of light that is emitted from the side of the opposite substrate 30 can be increased, it is possible to increase the efficiency of utilization of light.

Micro Lens Array Substrate

Figure 5A:
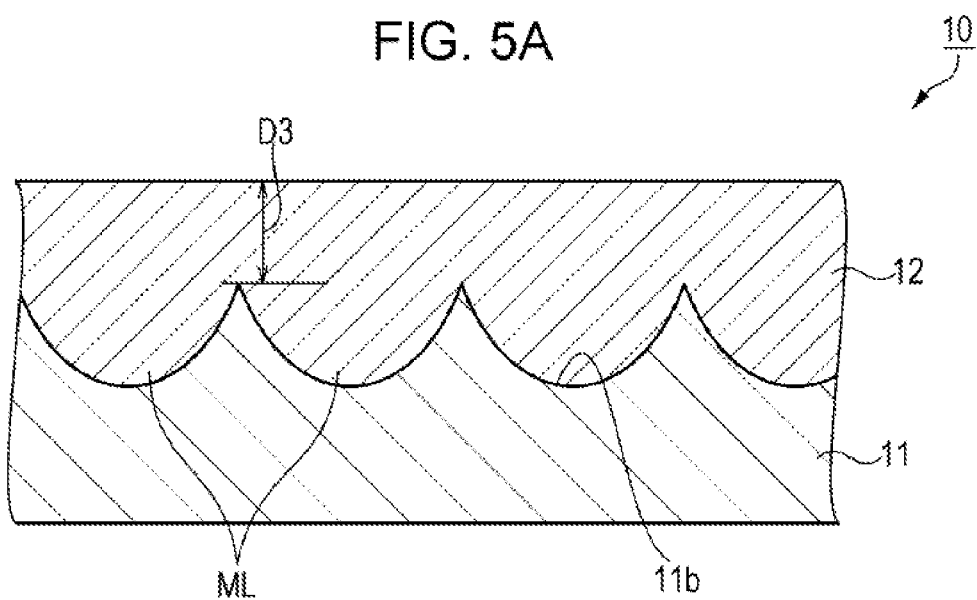
FIGS. 5A and 5B are schematic cross-sectional views illustrating the configuration of a micro lens array substrate according to the first embodiment.
Figure 5B:
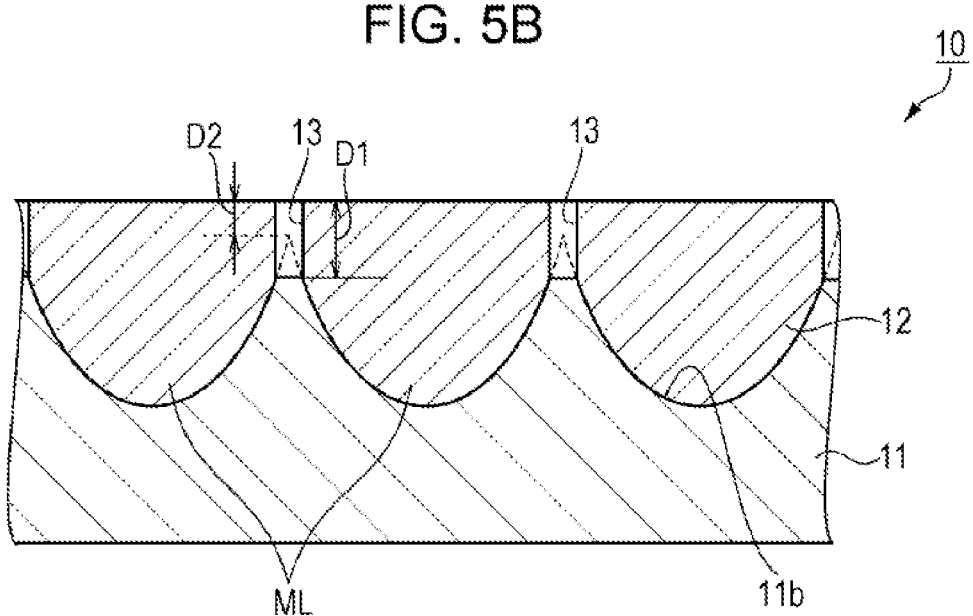

Subsequently, the micro lens array substrate 10 according to the first embodiment is further described referring to FIG. 4 and FIGS. 5A and 5B. FIG. 4 is a schematic plan view illustrating a configuration of the micro lens array substrate according to the first embodiment. FIGS. 5A and 5B are schematic cross-sectional views, each illustrating the configuration of the micro lens array substrate according to the first embodiment. Specifically, FIG. 5A is a schematic cross-sectional view taken along a line A-A' in FIG. 4, and FIG. 5B is a schematic cross-sectional view taken along a line B-B' in FIG. 4. Moreover, a cross-section along the line A-A' in FIG. 4 is equivalent to a cross-section along the line A-A' (X-direction) in FIG. 1.

In FIG. 4, the hatched light blocking layer 22 is indicated on the micro lens array substrate 10 in such a manner as to overlap a region of which a contour is indicated by dashed lines. This is done to help understand a positional relationship between the micro lens ML and the light blocking layer 22 when viewed from above. As illustrated in FIG. 4, the light blocking layer 22 is provided in the shape of a lattice along the X-direction (first direction) and the Y-direction (second direction) and has the opening portion 22a in the almost-rectangular shape. The pixels P are partitioned by the light blocking layer 22 into the shape of a lattice and are arranged into the shape of a matrix along the X-direction and the Y-direction.

In FIG. 4, the line A-A' is a line that is along the X-direction and links the planar central positions of the regions of the pixels P together. The line B-B' is a line that diagonally links intersection points on the lattice-shaped light blocking layer 22 together. The line B-B' is also a line that links together the planner central positions of the regions of the pixels P, which are located at opposite angles. A direction along the line B-B' is defined as the W-direction, which is a third direction. The W-direction is a direction in which the X-direction and the Y-direction intersect each other.

The concave portions 11b in the substrate 11 are partitioned into the shape of a lattice, corresponding to the pixels P. The concave portion 11b is formed in the shape of a curved surface that concentrically tapers towards its bottom. Therefore, a bottom portion of the concave portion 11b is almost consistent with the planar central position of the region of the pixel P. The micro lenses ML are arranged into the shape of a matrix, corresponding to the pixels P. The light blocking layer 22 overlaps borders between the light blocking layer 22 and the micro lenses ML arranged into the shape of a matrix when viewed from above.

The through-hole 13 that extends to the substrate 11 is provided in a position in the lens layer 12, which overlaps an intersection point on the lattice-formed light blocking layer 22 when viewed from above. Therefore, the through-hole 13 is arranged in the positions corresponding to four corners of each micro lens ML. Furthermore, the through-hole 13 is provided between the adjacent micro lenses ML (between the concave portions 11b) in the W-direction. Because light incident on the lens layer 12 is not gathered and thus is utilized in the through-hole 13, the through-hole 13 is provided in such a manner as to overlap the light blocking layer 22. This can decrease light that is not utilized throughout the entire micro lens array substrate 10, compared to a case where the through-hole 13 does not overlap the light blocking layer 22.

A shape of the through-hole 13 when viewed from above is, for example, circular. The shape of the through-hole 13 when viewed from above may be in the shape of a rectangle or a polygon. It is preferable that a size of the through-hole 13 when viewed from above be equal to or smaller than that of a region that overlaps the light blocking layer 22 when viewed from above. By doing this, light that is not utilized can be more decreased, and a height difference resulting from the through-hole 13 can be prevented from being reflected in the region of the pixel P.

As illustrated in FIG. 5A, the micro lenses ML are formed to be continuous because the adjacent concave portions 11b are combined in the direction of the line A-A' and the through-hole 13 is not provided in the lens layer 12. A thickness of the lens layer 12 is defined as D3 in borders between the adjacent micro lenses ML in the direction of the line A-A'. Moreover, although not illustrated, also in the direction of linking together the planar central positions of the regions of the pixels P along the Y-direction, in the same manner, the micro lenses ML are formed to be continuous and the thickness of the lens layer 12 comes to D3 at the borders between the adjacent micro lenses ML.

As illustrated in FIG. 5B, in the direction of the line B-B', the through-hole 13 that extends to the substrate 11 is provided between the adjacent micro lenses ML in the lens layer 12, and the adjacent micro lenses ML are separated from each other. Because the direction of the line B-B' is a direction along a diagonal line, a distance between the planar centers of the adjacent micro lenses ML is greater, compared to the direction of the line A-A', and the thickness of the lens layer 12 at the border between the micro lenses ML is small. Therefore, when the thickness of the lens layer 12 at the border between the micro lenses ML that is present before the through-hole 13 is formed in the lens layer 12 is defined as D2, the thickness D2 is smaller than the thickness D3 (the lens layer 12 is thinner). For example, the thickness D2 is smaller than half the thickness D3 (the lens layer 12 is thinner). Furthermore, when a depth of the through-hole 13 from a surface of the lens layer 12 is defined as D1, the depth D1 of the through-hole 13 is greater than the thickness D2 (the through-hole 13 is deeper).

In the micro lens array substrate 10 according to the first embodiment, in the direction of the line B-B' (W-direction), the through-hole 13 is provided between the adjacent micro lenses ML, and the lens layer 12 is separated. Because of this, for example, although the micro lens array substrate 10 is exposed to temperature changes, such as high temperature heating or cooling, for example, during a process of forming the TFT 24 above the lens layer 12, because stress being applied to the lens layer 12 is distributed over the through-hole 13, warping of the micro lens array substrate 10 can be reduced.

Here, the liquid crystal display element (liquid crystal device) disclosed in JP-A-2011-118324 has a configuration in which the stress being applied to the lens layer is distributed and alleviated by separating the lens layer on the micro lens array substrate between the lenses. However, according to the configuration disclosed in JP-A-2011-118324, because the adjacent lenses in the X-direction, the Y-direction, and the W-direction are arranged with spacing in between, light incident on a space between the lenses is not gathered by the lens. This causes a concern that the efficiency of utilization of light will be decreased.

In contrast, in the micro lens array substrate 10 according to the first embodiment, the lens layer 12 is continuous, without any division, between the adjacent micro lenses ML in the direction of the line A-A' (X-direction and Y-direction). For this reason, because light incident between the adjacent micro lenses ML in the direction of the line A-A' is gathered by the micro lens ML and thus is utilized, the efficiency of utilization of light is improved, compared to the case where the micro lenses ML are arranged with spacing in between. Because of this, the crack in the lens layer 12 is suppressed, and additionally, the micro lens array substrate 10 capable of improving the efficiency of utilization of light can be provided.

Moreover, on one surface 11a (refer to FIG. 3) of the substrate 11, the lens layer 12 may be provided in only a region where the micro lens array MLA is arranged, that is, a region where the concave portion 11b is formed. When the lens layer 12 is not provided outside of the region where the micro lens array MLA is arranged, because a volume of the entire lens layer 12 can be more decreased, the stress being applied to the lens layer 12 can be more alleviated. Furthermore, when the lens layer 12 is present outside of the region where the micro lens array MLA is arranged, there is a case where the crack occurring in the lens layer 12 in this portion propagates up to the region where the micro lens array MLA is arranged, but because the lens layer 12 is provided in only the region where the micro lens array MLA is arranged, an occurrence of the crack can be avoided.

Method of Manufacturing Micro Lens Array Substrate

Figure 6A:
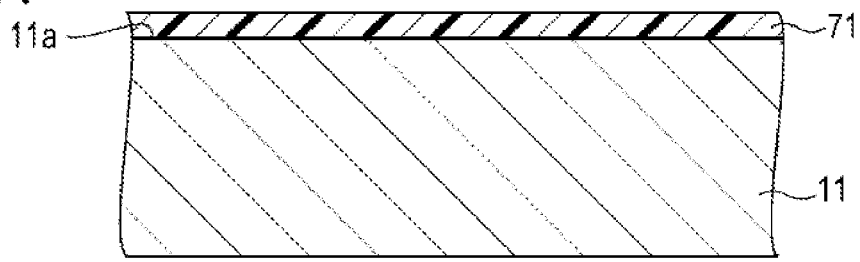
FIGS. 6A to 6D are schematic cross-sectional views illustrating a method of manufacturing the micro lens array substrate according to the first embodiment.
Figure 6B:
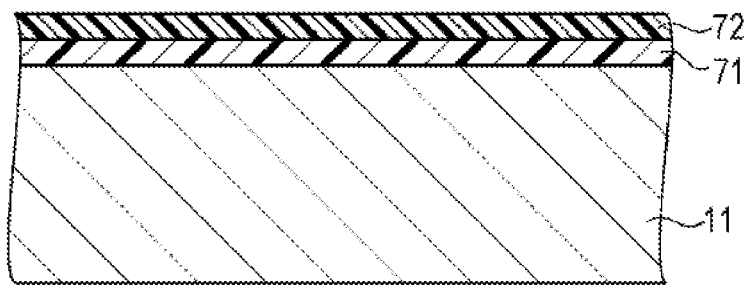
Figure 6C:
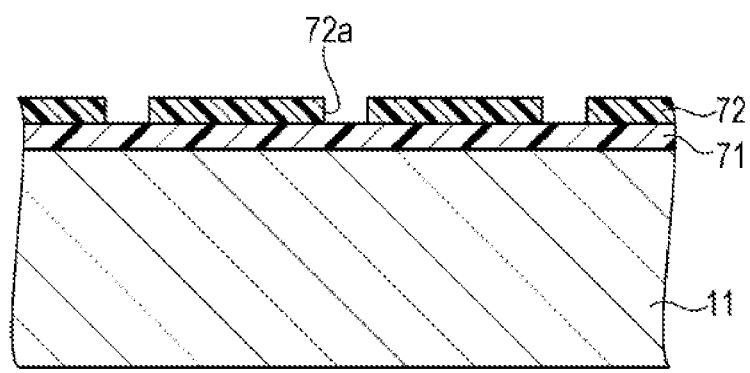
Figure 6D:
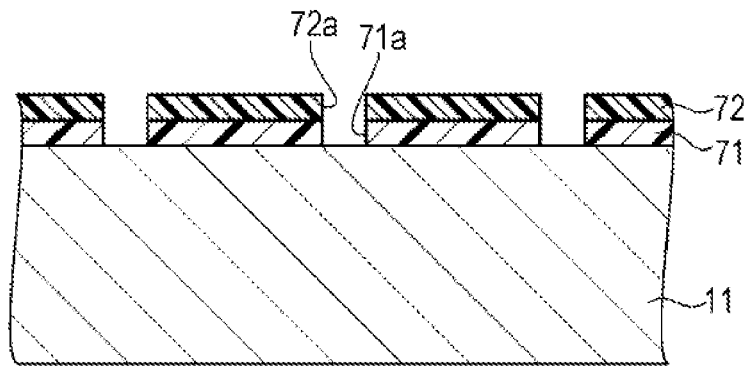
Figure 7A:
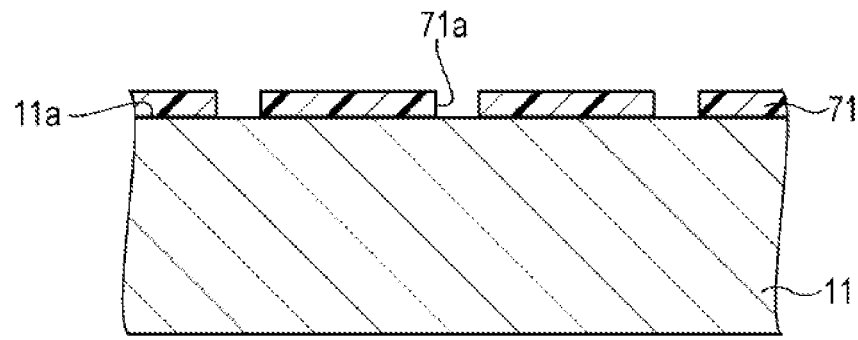
FIGS. 7A to 7C are schematic cross-sectional views illustrating the method of manufacturing the micro lens array substrate according to the first embodiment.
Figure 7B:
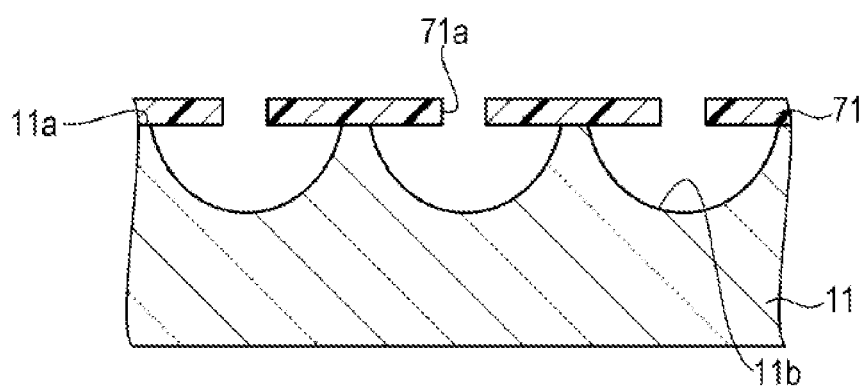
Figure 7C:
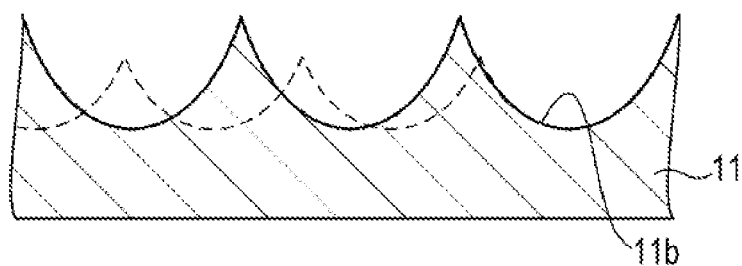
Figure 8A:
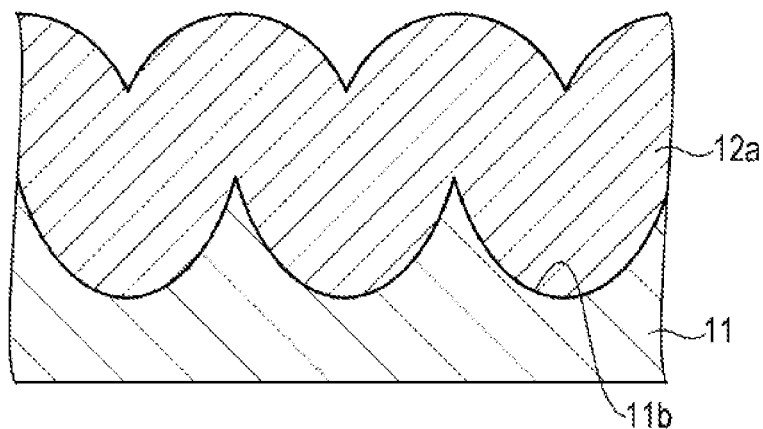
FIGS. 8A to 8C are schematic cross-sectional views illustrating the method of manufacturing the micro lens array substrate according to the first embodiment.
Figure 8B:
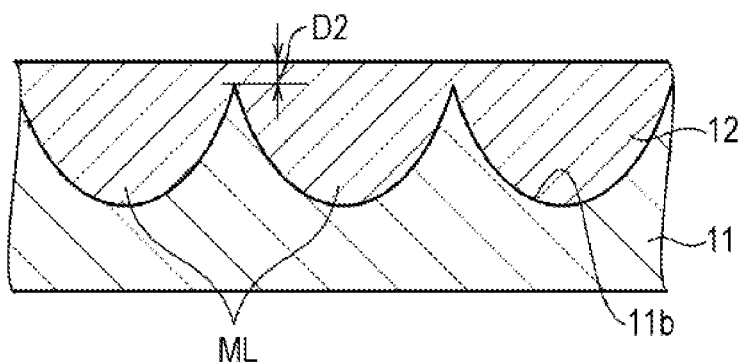
Figure 8C:
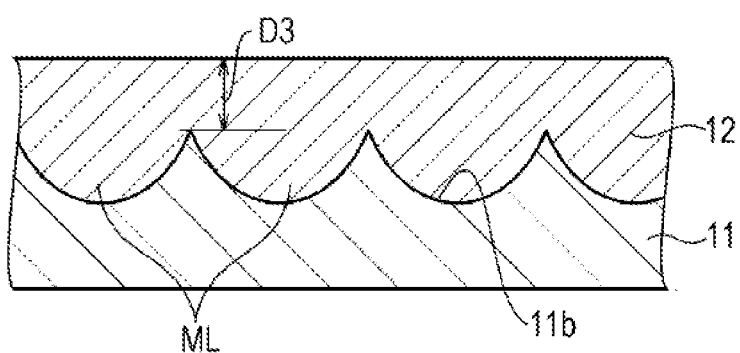

Next, a method of manufacturing the micro lens array substrate 10 according to the first embodiment is described referring to FIGS. 6A to 6D, FIGS. 7A to 7C, FIGS. 8A to 8C, and FIGS. 9A and 9B. FIGS. 6A to 6D, FIGS. 7A to 7C, FIGS. 8A to 8C, and FIGS. 9A and 9B are schematic cross-sectional views illustrating the method of manufacturing the micro lens array substrate according to the first embodiment. Specifically, FIGS. 6A to 6D, FIGS. 7A to 7C, FIGS. 8A to 8B, and FIGS. 9A and 9B are schematic cross-sectional views, taken along a line B-B' in FIG. 4. FIG. 8C is a schematic cross-sectional view, taken along a line A-A' in FIG. 4.

Moreover, although not illustrated, in a process of manufacturing the micro lens array substrate 10, processing is performed on a large-sized substrate (mother substrate) from which the multiple micro lens array substrates 10 are made, and finally, the mother substrate is cut into individual substrates. As a result, the multiple micro lens array substrates 10 are obtained. Therefore, in each process to be described below, the processing is performed on the mother substrate before it goes through the cutting process, but here, the processing on the individual micro lens array substrates 10 in a state of the mother substrate is described here.

First, as illustrated in FIG. 6A, a high temperature polysilicon film 71 is formed on one surface 11a of the substrate 11 with optical transparency, which is made from quartz and the like. Then, as illustrated in FIG. 6B, a resist layer 72 is dispensed onto the high temperature polysilicon film 71. Then, as illustrated in FIG. 6C, the resist layer 72 is patterned, for example, using a photolithography technique and thus, an opening portion 72a is formed. Moreover, although their illustrations are omitted, the opening portions 72a are arranged into the shape of a matrix when viewed from above, corresponding to the concave portions 11b that are to be formed in a subsequent process.

Then, as illustrated in FIG. 6D, dry etching processing is performed on the high temperature polysilicon film 71 with the resist layer 72 as an etching mask, and an opening portion 71a is formed in the high temperature polysilicon film 71. The opening portion 71a is formed in the same shape as the opening portion 72a in the resist layer 72 when viewed from above. Thereafter, as illustrated in FIG. 7A, the resist layer 72 is stripped off.

Then, as illustrated in FIG. 7B, isotropic etching processing, such as wet etching processing using etching liquid, is performed on the substrate 11, starting with the high temperature polysilicon film 71. In this process, a region that is in the almost-hemisphere shape when viewed from the front with the opening portion 71a serving as the center is removed from one surface 11a of the substrate 11. The concave portion 11b is formed in the shape of a concentric circle with the opening portion 71a serving as the center when viewed from above.

As illustrated in FIG. 7C, the wet etching processing is performed until the borders between the adjacent concave portions 11b is lower than one surface 11a of the substrate 11 and thus the high temperature polysilicon film 71 is removed. Moreover, in this process, the etching is temporarily performed with spacing between the adjacent concave portions 11b as illustrated in FIG. 7B, but the wet etching process may be again performed after removing the high temperature polysilicon film 71.

Because of this, the concave portion 11b in the shape of a curved surface when viewed from the front, but in the shape of a concentric circle when viewed from above, is increased in size. As a result, a height of the border between the concave portion 11b from the bottom of the concave portion 11b in the direction of the line B-B' indicated by a solid line is greater than that of the border between the concave portion 11b from the bottom of the concave portion 11b in the direction of the line A-A' indicated by a dashed line.

Then, as illustrated in FIG. 8A, a lens layer 12a, made from inorganic material with optical transparency, which is higher in refractive index than the substrate 11, is formed in such a manner as to fill in the concave portion 11b formed in the substrate 11 (lens layer formation process). The lens layer 12a can be formed, for example, using a chemical vapor deposition technique (CVD). The height difference between the bottom and the border portion of the concave portion 11b is reflected in the surface of the lens layer 12a.

Then, as illustrated in FIG. 8B, flattening processing, such as chemical mechanical polishing (CMP) processing, is performed on a surface of the lens layer 12a. A remaining thickness of the lens layer 12a after performing the flattening processing, that is, a thickness of the lens layer 12, is properly set, based on optical conditions, such as a focal point distance of the micro lens ML.

Here, the thickness of the lens layer 12 is defined as D2 at the borders between the micro lenses ML along the line B-B'. Further, as illustrated in FIG. 8C, the thickness of the lens layer 12 is defined as D3 at the borders between the micro lenses ML along the line A-A'. The height of the border between the concave portions 11b in the direction of the line is greater than that of the border between the concave portions 11b in the direction of the line A-A', and so, the expression for this becomes D2<D3.

Figure 9A:
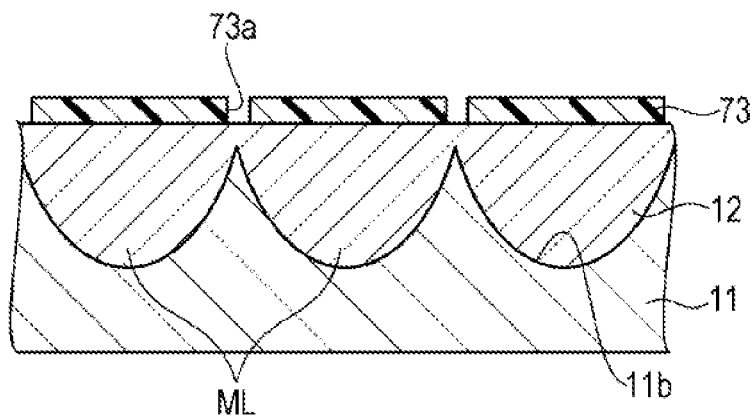
FIGS. 9A and 9B are schematic cross-sectional views illustrating the method of manufacturing the micro lens array substrate according to the first embodiment.

Then, as illustrated in FIG. 9A, a resist layer 73 is formed on the surface of the lens layer 12. Then, an opening portion 73a is formed by patterning the resist layer 73, for example, the photolithography technique. Moreover, although its illustration is omitted, the opening portion 73a is formed, for example, in the four corners of the concave portion 11b, in the shape of a circle when viewed from above, corresponding to the through-hole 13 that is to be formed in the subsequent process.

Figure 9B:
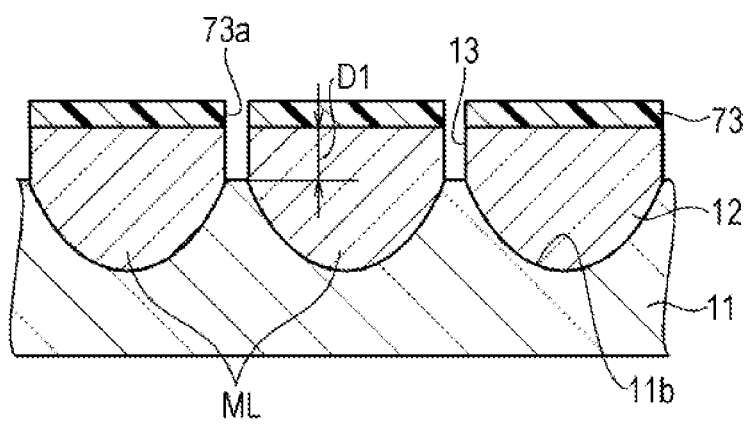

Then, as illustrated in FIG. 9B, anisotropic etching is performed on the lens layer 12, starting with the resist layer 73 (stripping process). In the stripping process, the etching processing is performed, for example, using a dry etching technique, until a depth from the surface of the lens layer 12 becomes D1 that is a difference in height between the surfaces of the lens and the substrate 11. The expression for a relationship between D2 and the depth D1 to which the lens layer 12 is etched is D2<D1, as described above. Because of this, the through-hole 13 is formed, and the micro lens array substrate 10 is completed.

If the element substrate 20 equipped with the micro lens array substrate 10 is manufactured thereafter, the pass layer 21, the light blocking layer 22, and the insulating layer 23, and the TFT 24 are formed, in this order, on the micro lens array substrate 10.

Moreover, in the stripping process, it is preferable that a region, more outward than the region where the micro lens array MLA is arranged, of the lens layer 12, also is stripped off together. When the lens layer 12 is continuous between the multiple micro lens array substrates 10 in the state of the mother substrate, there is a concern that the stress concentrates on one part of the mother substrate and thus the crack occurs. Furthermore, there can be a case where the crack occurring in one part of the mother substrate propagates up to the multiple micro lens array substrates 10.

In the stripping process, by stripping the region, more outward than the region where the micro lens array MLA is arranged, of the lens layer 12, the lens layer 12 is independent in each of the micro lens array substrates 10 in the state of the mother substrate. This alleviates stress concentration. Furthermore, because the lens layer 12 is independent in each of the micro lens array substrates 10, although the crack occurs in one part of the mother substrate, the crack can be prevented from propagating to the multiple micro lens array substrates 10.

As described above, according to the first embodiment, the following effects are obtained.

(1) In the micro lens array substrate 10, in the lens layer 12 that is formed in such a manner as to fill in the concave portion 11b in the substrate 11 and to cover the region where the concave portion 11b is formed, the through-hole 13 extending to the substrate 11 is formed between the adjacent concave portions 11b in the W-direction among the X- and Y-directions (direction of the line A-A') and the W-direction (direction of the line B-B'). For this reason, because in the W-direction (direction of the line B-B'), the lens layer 12 is separated by the through-hole 13 between the adjacent concave portions 11b (micro lenses ML), the stress being applied to the lens layer 12 is distributed. Furthermore, because the volume of the entire lens layer 12 is decreased by as much as a space occupied by the through-hole 13, the stress being applied to the lens layer 12 is alleviated. On the other hand, because the lens layer 12 is continuous between the adjacent concave portions 11b in the X- and Y-directions (direction of the line A-A') and light incident on a space between the micro lenses ML is gathered by the micro lens ML and thus is utilized, the efficiency of utilization of light is improved, compared to the case where the micro lenses ML are arranged with spacing in between. Because of this, the crack in the lens layer 12 is suppressed, and additionally, the micro lens array substrate 10 capable of improving the efficiency of utilization of light can be provided.

(2) Because the concave portions 11b in the substrate 11 are partitioned into the shape of a lattice along the X-direction and the Y-direction and the through-hole 13 in the lens layer 12 is provided in the position that corresponds to the intersection point on the lattice, the stress being applied to the lens layer 12 can be distributed over the adjacent micro lenses ML in the W-direction (direction of the line B-B') that is the direction in which the intersection points on the lattice are diagonally linked together. Furthermore, because the lens layer 12 is continuous in positions other than the position that corresponds to the intersection point on the lattice, the efficiency of utilization of light can be improved.

(3) In the element substrate 20 equipped with the TFTs 24, each being provided in every pixel P, and the micro lens array substrate 10, the light blocking layer 22 is provided in the region that overlaps the channel region of the TFT 24 that needs light blocking, and the through-hole 13 is provided in the region that is made from the light blocking layer 22 of the lens layer 12. This can more decrease light that is not utilized.

(4) The liquid crystal device 1 is equipped with the micro lens array substrate 10 that suppresses the crack in the lens layer 12 and additionally improves the efficiency of utilization of light. This makes it possible to provide the liquid crystal device 1 that is high in quality and is bright in display.

Second Embodiment

Liquid crystal devices according to second and later embodiments are different in configuration of the micro lens array substrate, but because the other configurations are almost the same, a configuration of the micro lens array substrate and a method of manufacturing the micro lens array substrate are described, and descriptions of the other parts of the liquid crystal device are omitted.

Micro Lens Array Substrate

Figure 10:
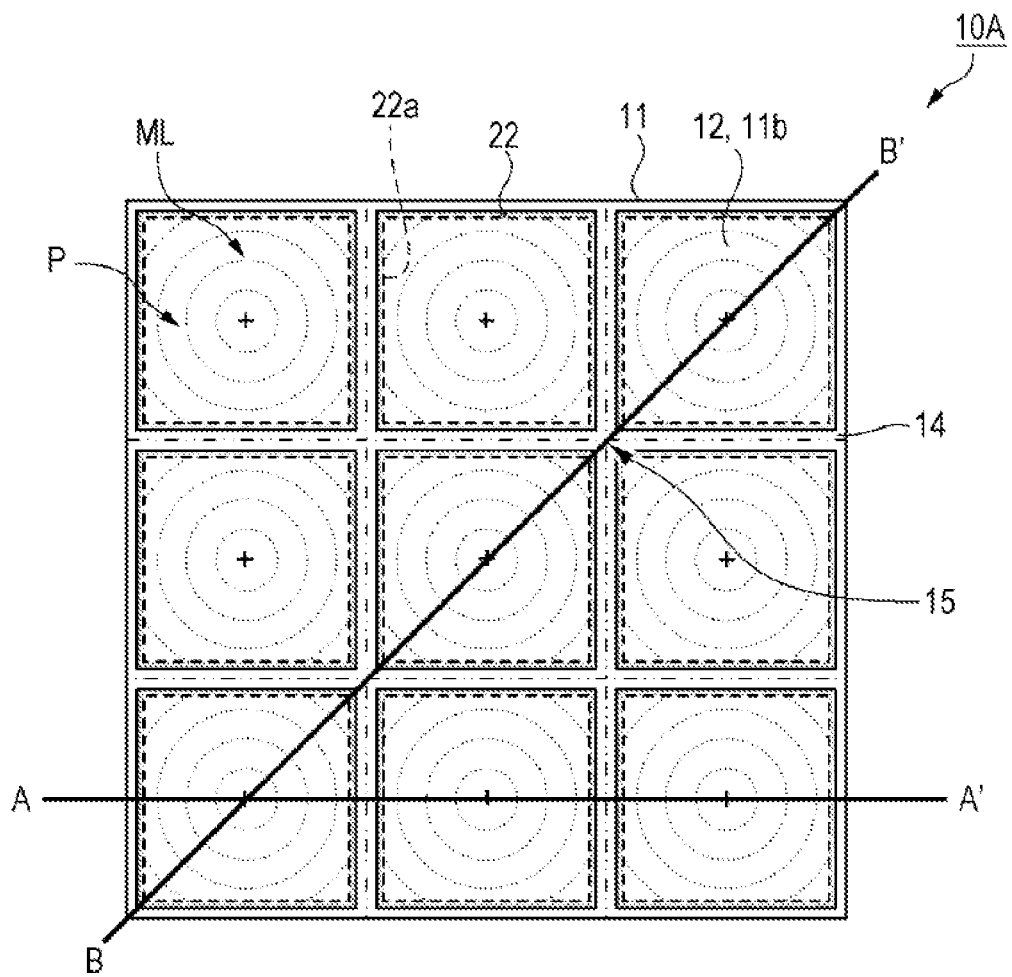
FIG. 10 is a schematic plan view illustrating a configuration of a micro lens array substrate according to a second embodiment.
Figure 11A:
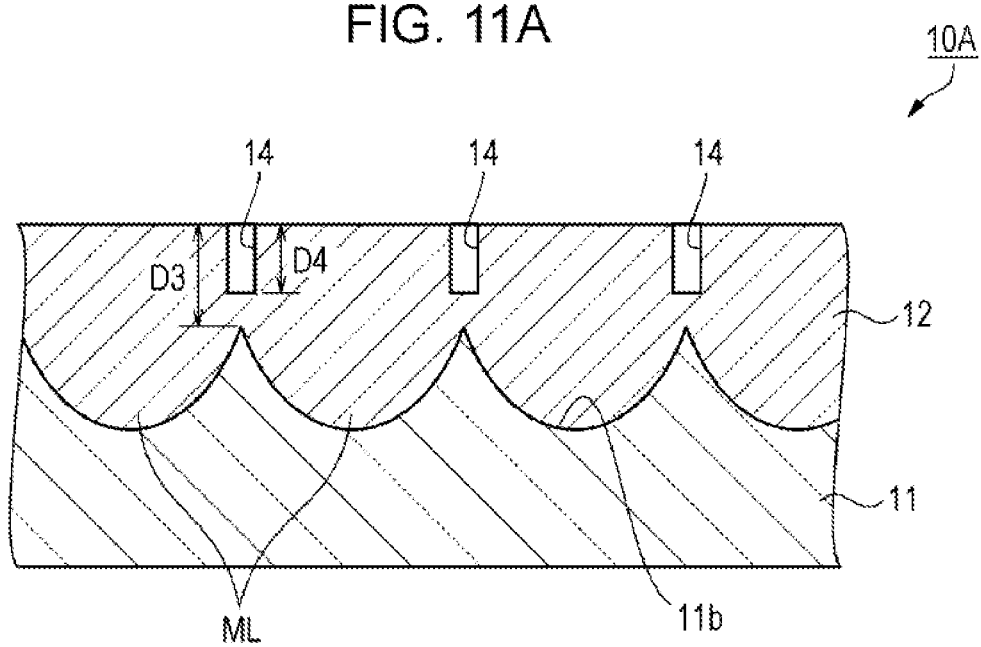
FIGS. 11A and 11B are schematic cross-sectional views illustrating the configuration of the micro lens array substrate according to the second embodiment.
Figure 11B:
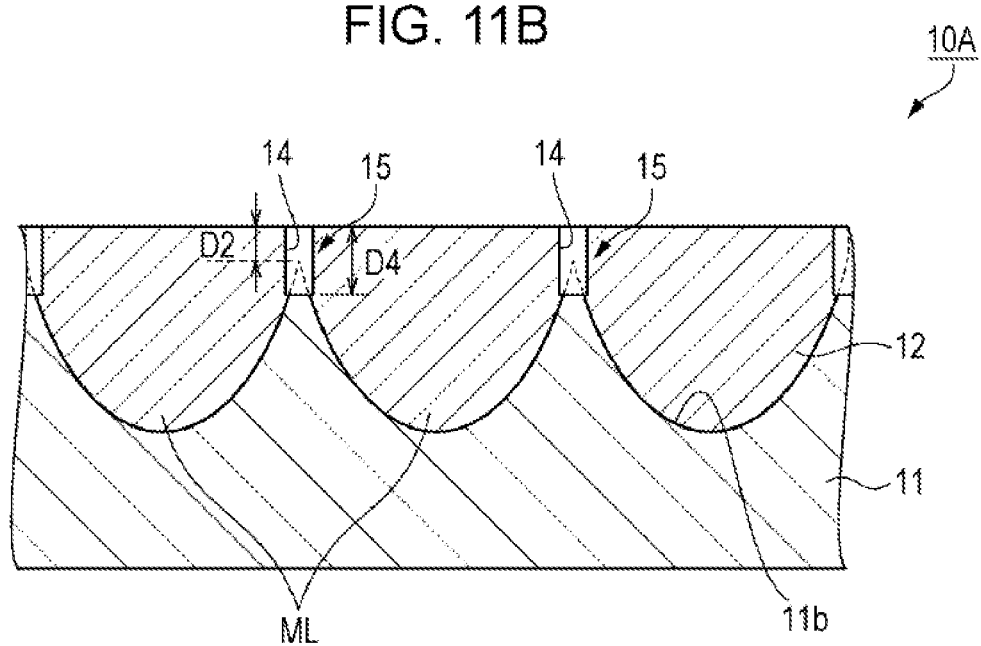

The configuration of the micro lens array substrate according to the second embodiment is described. FIG. 10 is a schematic plan view illustrating the configuration of the micro lens array substrate according to the second embodiment. FIGS. 11A and 11B are schematic cross-sectional views, each illustrating the configuration of the micro lens array substrate according to the second embodiment. Specifically, FIG. 11A is a schematic cross-sectional view taken along a line A-A' (X-direction) in FIG. 10, and FIG. 11B is a schematic cross-sectional view taken along a line B-B' (W-direction) in FIG. 10.

A micro lens array substrate 10A according to the second embodiment is different from the micro lens array substrate 10 according to the first embodiment in that a groove portion 14 including a discontinuous part is provided, but the micro lens array substrates 10 and 10A are almost the same in the other configurations. Moreover, constituent elements common to the first embodiment are given like reference numerals, and their descriptions are omitted.

As illustrated in FIG. 10, micro lenses ML are arranged into the shape of a matrix on the micro lens array substrate 10A according to the second embodiment, corresponding to arrangement of pixels P, in the same manner as with the micro lens array substrate 10 according to the first embodiment. The groove portion 14 is provided in a lens layer 12 on the micro lens array substrate 10A.

The groove portion 14 is provided in the shape of a lattice along the X-direction and the Y-direction in such a manner as to overlap a light blocking layer 22 when viewed from above. That is, the groove portion 14 is arranged between the adjacent micro lenses ML (between concave portions 11b) in the X-direction and the Y-direction.

An intersection point 15 in the X-direction and the Y-direction on the groove portion 14 overlaps an intersection on the lattice-formed light blocking layer 22 and is positioned at the four corners of the micro lens ML. Therefore, the intersection point 15 on the groove portion 14 is arranged between the adjacent micro lenses ML (between concave portions 11b) in the direction of the line B-B'.

Moreover, it is preferable that a width of the groove portion 14 in the X-direction and the Y-direction is equal to or smaller than that of the light blocking layer 22. By doing this, the intersection point 15 where light incident on the groove portion 14 is not utilized can be arranged within a region of the light blocking layer 22. Furthermore, it is made possible that a high difference that results from the groove portion 14 is not reflected in the pixel P.

As illustrated in FIG. 11A, the groove portion 14 is provided between the adjacent micro lenses ML (between the concave portions 11b) in the direction of the line A-A'. When a depth of the groove portion 14 from the surface of the lens layer 12 is defined as D4, the depth D4 is smaller than a depth D3 of the lens layer 12 at a border between the adjacent micro lenses ML in the direction of the line A-A' (the groove portion 14 is shallower).

Therefore, between the adjacent micro lenses ML in the direction of the A-A', the groove portion 14 does not extend to the substrate 11, and the lens layer 12 is not separated. Therefore, although the groove portion 14 is present in the lens layer 12 in the direction of the line A-A', the incident light can be gathered and thus is utilized.

As illustrated in FIG. 11B, the intersection point 15 in the X-direction and the Y-direction on the groove portion 14, as illustrated above, is positioned between the adjacent micro lenses ML (between the concave portion 11b) in the direction of the XIB-XIB. The depth D4 of the groove portion 14 is the same as at the intersection point 15. The depth D4 of the groove portion 14 is greater than the thickness D2 of the lens layer 12 at the border between the adjacent micro lenses ML in the direction of the line B-B' (the groove portion 14 is deeper). That is, the expression for a relationship between the thickness D2, the depth D3, and the depth D4 is $D2<D4<D3$.

Therefore, between the adjacent micro lenses ML in the direction of the line B-B', the groove portion 14 extends to the substrate 11 at the intersection point 15, and the lens layer 12 is separated. That is, the adjacent micro lenses ML are combined in the direction of the line A-A' (X-direction), and the adjacent micro lenses ML are separated in the direction of the line B-B' (W-direction). Accordingly, the same effect as with the first embodiment is obtained also in the micro lens array substrate 10A according to the second embodiment.

Method of Manufacturing Micro Lens Array Substrate

Although its illustration is omitted, as with the stripping process in the method of manufacturing the micro lens array substrate according to the first embodiment, the groove portion 14 can be formed by performing anisotropic etching on the lens layer 12 in the shape of a lattice when viewed from above. As described according to the first embodiment, because the lens layer 12 at the border between thicknesses of the adjacent micro lenses ML in the direction of the line A-A' and in the direction of the line B-B' is different, the depth D4 to which the lens layer 12 is etched, for example, is smaller (the lens layer 12 is shallower) than the depth D3 illustrated in FIG. 11A and is greater (the lens layer 12 is deeper) than the depth D2 illustrated in FIG. 11B. As a result, the groove portion 14 extending to the substrate 11 at the intersection point 15 can be formed. Moreover, according to the second embodiment, an opening portion 73a (FIG. 9A) that is formed in a resist layer 73 has the shape corresponding to the groove portion 14.

As described above, according to the second embodiment, the following effects are obtained.

(1) In the micro lens array substrate 10A, the groove portion 14 that is provided in the shape of a lattice along the X-direction and the Y-direction in the lens layer 12 extends to the substrate 11 at the intersection point 15. For this reason, because the lens layer 12 is separated at the intersection point 15 in the W-direction, stress being applied to the lens layer 12 in the W-direction (direction of the line B-B') is distributed. Furthermore, because a volume of the entire lens layer 12 is decreased by as much as a space occupied by the groove portion 14, the stress being applied to the lens layer 12 is alleviated. On the other hand, because the lens layer 12 is continuous between the adjacent concave portions 11b (micro lenses ML) in the X- and Y-directions (direction of the line A-A') and light incident between the micro lenses ML is gathered by the micro lens ML and thus is utilized, the efficiency of utilization of light is improved, compared to the case where the micro lenses ML are arranged with spacing in between. Because of this, in the same manner as with the first embodiment, the crack in the lens layer 12 is suppressed, and additionally, the micro lens array substrate 10A capable of improving the efficiency of utilization of light can be provided.

(2) Because the groove portion 14 is provided in the shape of a lattice in such a manner as to overlap the light blocking layer 22 when viewed from above, a part of the intersection point 15, where incident light reaching the substrate 11 is not utilized, also is arranged in a region that overlaps the light blocking layer 22 that blocks the incident light. For this reason, because the light not utilized can be more decreased throughout the entire micro lens array substrate 10A, the efficiency of utilization of light can be more improved, compared to a case where the groove portion 14 is provided in a region that does not overlap the light blocking layer 22.

Moreover, the shape of the groove portion 14 is not limited to the shape of a lattice described above, and for example, the groove portion 14 may be arranged along only one of the X-direction and the Y-direction. Furthermore, in terms of a form, the groove portion 14 may be separated between the intersection points in the X-direction and the Y-direction in the shape of a lattice, that is, be formed in the four corners of each micro lens ML in the shape of a cross when viewed from above (between the adjacent micro lenses ML in the direction of the line B-B').

Third Embodiment

Micro Lens Array Substrate

Figure 12:
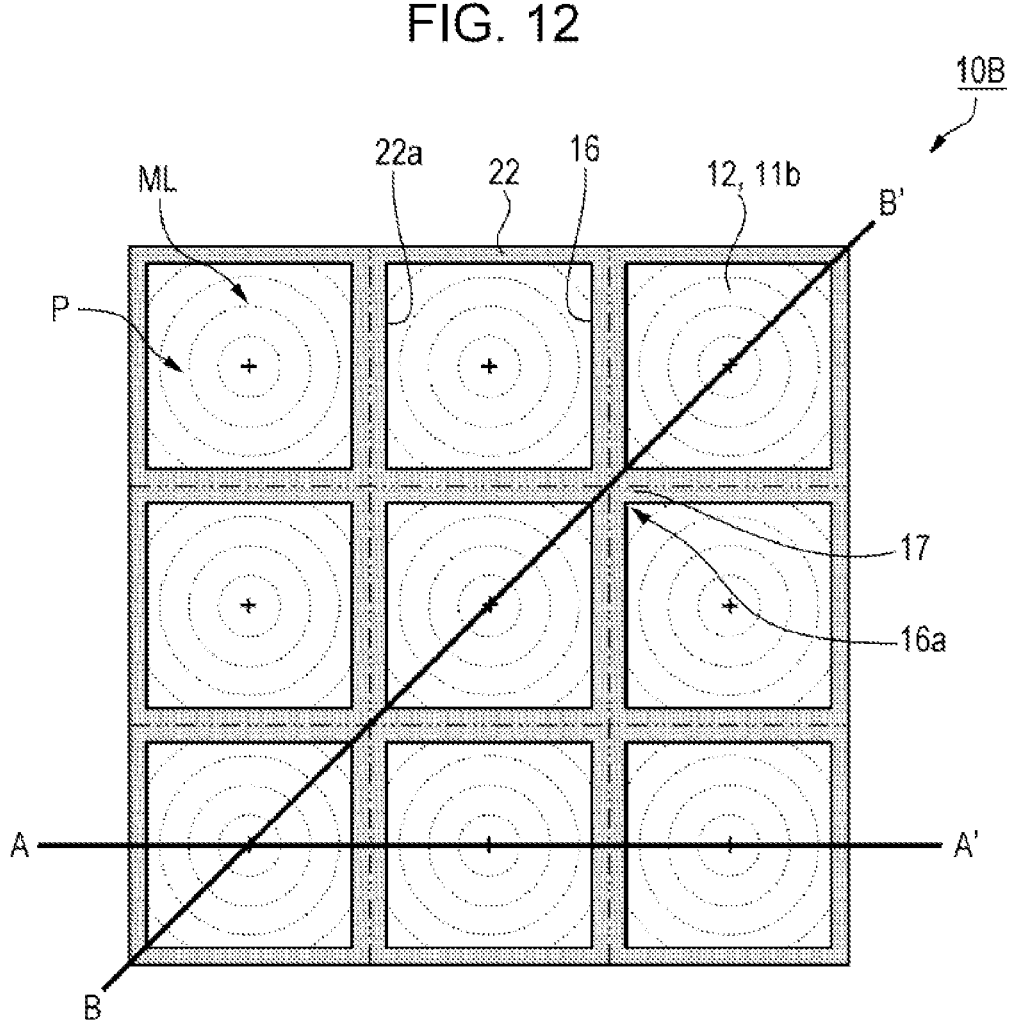
FIG. 12 is a schematic plan view illustrating a configuration of a micro lens array substrate according to a third embodiment.
Figure 13A:
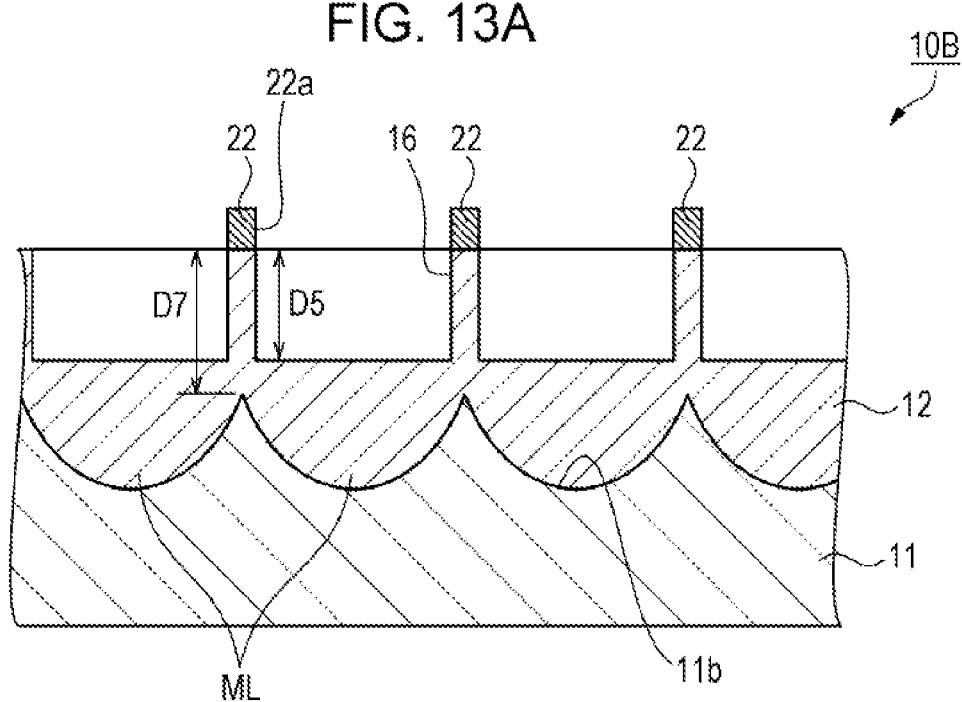
FIGS. 13A and 13B are schematic cross-sectional views illustrating the configuration of the micro lens array substrate according to the third embodiment.
Figure 13B:
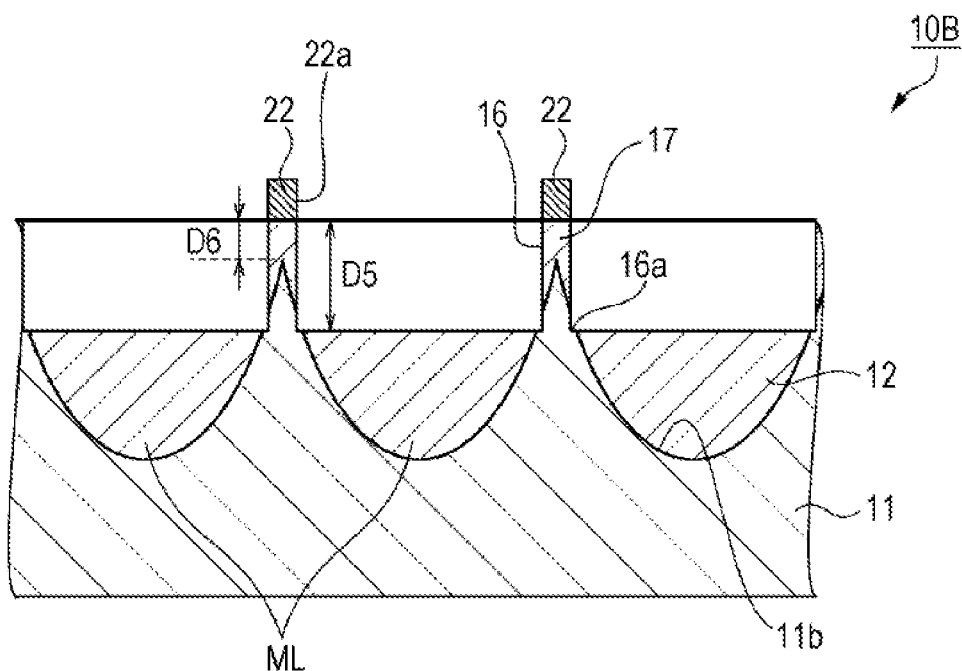

Next, a configuration of a micro lens array substrate according to a third embodiment is described. FIG. 12 is a schematic plan view illustrating the configuration of the micro lens array substrate according to the third embodiment. FIGS. 13A and 13B are schematic cross-sectional views, each illustrating the configurations of the micro lens array substrate according to the third embodiment. Specifically, FIG. 13A is a schematic cross-sectional view taken along a line A-A' (X-direction) in FIG. 12, and FIG. 13B is a schematic cross-sectional view taken along a line B-B (W-direction) in FIG. 12.

A micro lens array substrate 10B according to the third embodiment is different from the micro lens array substrates 10 and 10A according to the embodiment described above in that a discontinuous part is provided along the thickness direction on a lens layer 12, but the micro array substrates 10, 10A, and 10B are almost the same in the other configurations. Moreover, constituent elements common to the embodiment described above are given like reference numerals, and their descriptions are omitted.

As illustrated in FIG. 12, micro lenses ML are arranged into the shape of a matrix on the micro lens array substrate 10B according to the third embodiment, corresponding to arrangement of pixels P, in the same manner as with the micro lens array substrates 10 and 10A according to the embodiment described above. In the micro lens array substrate 10B, a concave portion 16 is provided in a region that overlaps an opening portion 22a in a light blocking layer 22, with a part in the shape of a lattice that overlaps the light blocking layer 22 when viewed from above serving as a partition wall, in the lens layer 12. Then, an angular part 16a of each of the four corners of the concave portion 16 becomes a separation portion 17 that makes the lens layer 12 discontinuous.

As illustrated in FIG. 13A, the concave portion 16 is provided on the lens layer 12, but within the opening portion 22a in the light blocking layer 22, corresponding to a concave portion 11b in the substrate 11. In other words, a part of the lens layer 12, which overlaps the light blocking layer 22, is the partition wall that partitions the concave portions 16. When a depth of the concave portion 16 from the surface of the lens layer 12 is defined as D5, the depth D5 is smaller than a thickness D7 of the lens layer 12 at a border between the adjacent micro lenses ML in the direction of the line A-A' (the concave portion 16 is shallower). Therefore, a bottom of the concave portion 16 does not extend to a substrate 11 in the direction of the line A-A'.

As illustrated in FIG. 13B, the depth D5 of the concave portion 16 from the surface of the lens layer 12 is smaller than a thickness D6 of the lens layer 12 at a border between the adjacent micro lenses ML in the direction of the line B-B' (the concave portion 16 is shallower). That is, the expression for a relationship between the depth D5, the thickness D6, and the thickness 7 is D6<D5<D7. Then, the bottom of the concave portion 16 extends to the substrate 11 in the angular part 16a of each of the four corners and is formed in such a manner as to dig into the substrate 11. Therefore, a part of the partition wall of the lens layer 12, which is positioned at the border between the adjacent micro lenses ML in the direction of the line B-B', becomes the separation portion 17 that is separated from the lens layer 12 in the angular part 16a.

The lens layer 12 is continuous between the adjacent micro lenses ML in the direction of the line A-A' in this manner, but is separated in the angular part 16a of each of four corners in the direction of the line B-B'. That is, the adjacent micro lenses ML are combined in the direction of the line A-A' (X-direction), and the adjacent micro lenses ML are separated in the direction of the line B-B' (W-direction). Accordingly, the same effect as with the embodiment described above is obtained also in the micro lens array substrate 10B according to the third embodiment.

Method of Manufacturing Micro Lens Array Substrate

Figure 14A:
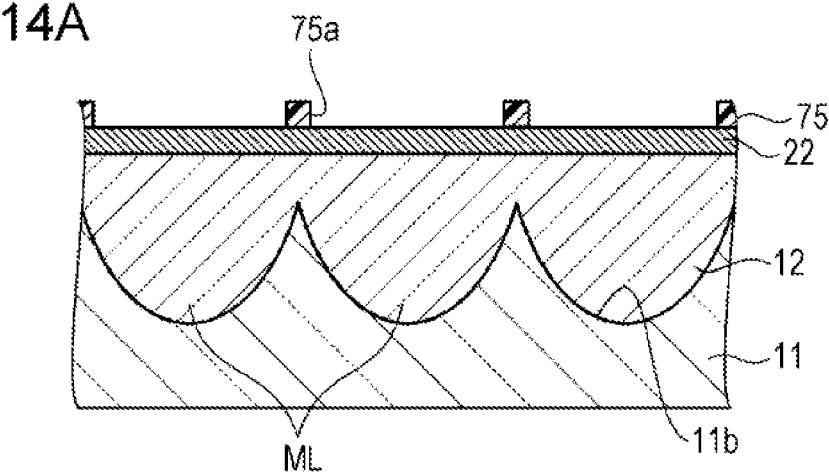
FIGS. 14A to 14C are schematic cross-sectional diagrams illustrating a method of manufacturing the micro lens array substrate according to the third embodiment.
Figure 14B:
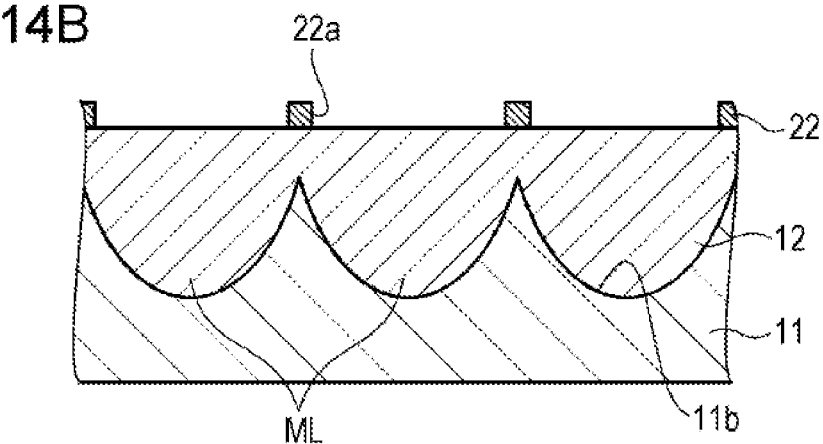
Figure 14C:
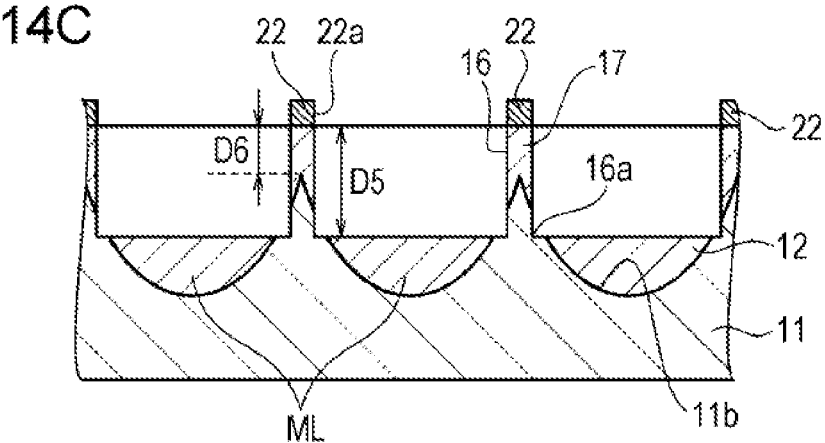

Next, a method of manufacturing the micro lens array substrate 10B according to the third embodiment is described referring to FIGS. 14A to 14C. FIGS. 14A to 14C are schematic cross-sectional views illustrating the method of manufacturing the micro lens array substrate according to the third embodiment. Specifically, FIGS. 14A to 14C are schematic cross-sectional views, taken along a line B-B' in FIG. 12.

In the method of manufacturing the micro lens array substrate 10B according to the third embodiment, processes subsequent to the flattening processing performed on the lens layer 12 illustrated in FIG. 8B are different, compared to the first embodiment. According to the third embodiment, as illustrated in FIG. 14A, an electrode, a wiring line, and the like (which are not illustrated) through which an electric signal is supplied to a TFT 24, and a light blocking layer 22 are formed on a surface of the lens layer 12 after the flattening processing (light blocking layer formation process). In the following description, the electrode, the wiring line, and the like, and the light blocking layer 22 are collectively referred to as the light blocking layer 22.

Moreover, because the light blocking layer 22 is provided on the lens layer 12, the lens layer 12 functions also as a pass layer 21 (refer to FIG. 3) in the micro lens array substrate 10B. Therefore, a layer thickness of the lens layer 12 after performing the flattening processing on the surface of the lens layer 12 determines a relationship in the thickness direction (Z-direction) between the micro lens ML and the light blocking layer 22.

Subsequent to the light blocking layer formation process, the light blocking layer 22 is patterned using a resist layer 75 formed on the light blocking layer 22 as illustrated in FIG. 14A. The resist layer 75 is in the shape of a lattice when viewed from above, and a rectangular-shaped opening portion 75a is formed in the resist layer 75. A part of the resist layer 75, which overlaps the opening portion 75a, becomes the opening portion 22a in the light blocking layer 22. Then, as illustrated in FIG. 14B, the resist layer 75 is stripped off.

Then, as illustrated in FIG. 14C, anisotropic etching is performed on the lens layer 12 with the light blocking layer 22 serving as a mask (stripping process). The use of the light blocking layer 22 as a mask in the stripping process can make an etching mask for etching the lens layer 12 unnecessary. This can reduce a photolithography process for forming the etching mask. Furthermore, the etching of the lens layer 12 with the light blocking layer 22 serving as the mask suppresses the deviation in planar position between a micro lens array and the light blocking layer 22. This suppresses a decrease in the efficiency of utilization of light that results from the mutual positional deviation.

In the stripping process illustrated in FIG. 14C, the concave portion 16 is formed by stripping off a part of the lens layer 12, which is not covered with the light blocking layer 22, that is, a part within the opening portion 22a, along the thickness direction from the side of the light blocking layer 22. At this time, the etching is performed up to the depth D5 by which the substrate 11 is exposed at a border between the part (the separation portion) 17 of the lens layer 12, which is covered with the light blocking layer 22, and the part of the lens layer 12, which is within the opening portion 22a, that is, at the angular part 16a of the concave portion 16. Accordingly, the concave portion 16 is formed, and the micro lens array substrate 10B is completed.

If the element substrate 20 equipped with the micro lens array substrate 10B is manufactured thereafter, a height difference of a surface is alleviated by forming an insulating layer 23 on the micro lens array substrate 10B and the light blocking layer, and the TFT 24 is formed on the insulating layer 23. Moreover, after the stripping process, for example, the height difference of the surface of the micro lens array substrate 10B (the lens layer 12) due to the concave portion 16 or the light blocking layer 22 may be alleviated by providing a buried layer that fills in the concave portion 16.

According to the third embodiment, the following effects can be obtained.

(1) In the micro lens array substrate 10B, stress being applied to the lens layer 12 in the W-direction is distributed because the lens layer 12 is separated in the W-direction (direction of the line B-B') in the angular part 16a of each of the four corners of the concave portion 16 provided in the lens layer 12. Furthermore, because a volume of the entire lens layer 12 is decreased by as much as a space occupied by the concave portion 16, the stress being applied to the lens layer 12 is alleviated. On the other hand, because the lens layer 12 is continuous between the adjacent concave portions 11b (micro lenses ML) in the X- and Y-directions (direction of the line A-A') and light incident between the micro lenses ML is gathered by the micro lens ML and thus is utilized, the efficiency of utilization of light is improved, compared to the case where the micro lenses ML are arranged with spacing in between. Because of this, in the same manner as with the embodiments described above, the crack in the lens layer 12 is suppressed, and additionally, the micro lens array substrate 10B capable of improving the efficiency of utilization of light can be provided.

(2) Because after forming the lens layer 12 and forming the light blocking layer 22 on the lens layer 12, the part not covered with the light blocking layer 22 is stripped off along the thickness direction from the side of the light blocking layer 22, the lens layer 12 can be etched using the light blocking layer 22 as the etching mask. Because this can make the mask for etching the lens layer 12 unnecessary, the photolithography process of forming the mask for etching the lens layer 12 can be shortened. Furthermore, the etching of the lens layer 12 with the light blocking layer 22 as the etching mask suppresses the positional deviation between the angular part 16a of the concave portion 16 in which the substrate 11 is exposed and the light blocking layer 22 above the micro lens ML. This can suppress the decrease in the efficiency of utilization of light that results from the mutual positional deviation between the micro lens ML and the light blocking layer 22.

(3) Because a positional relationship in the thickness direction (Z-direction) between the micro lens ML and the light blocking layer 22 is determined by the layer thickness of the lens layer 12 after the flattening processing, the layer thickness of the lens layer 12 at the time of the flattening processing is controlled. This makes it possible to meet optical conditions such as a focal point distance of the micro lens ML.

Fourth Embodiment

Micro Lens Array Substrate

Figure 15A:
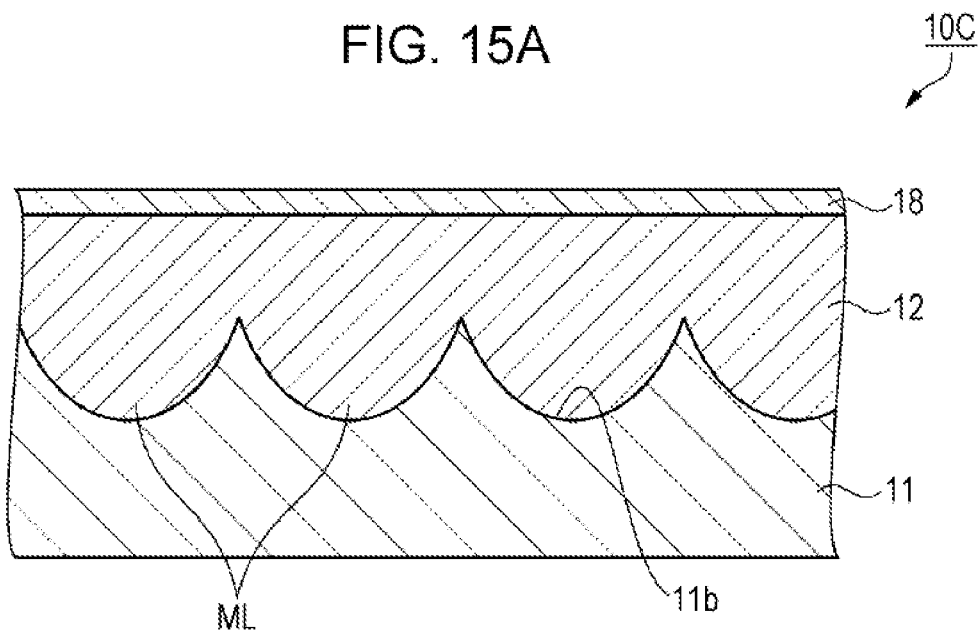
FIGS. 15A and 15B are schematic plan views illustrating a configuration of a micro lens array substrate according to a fourth embodiment.
Figure 15B:
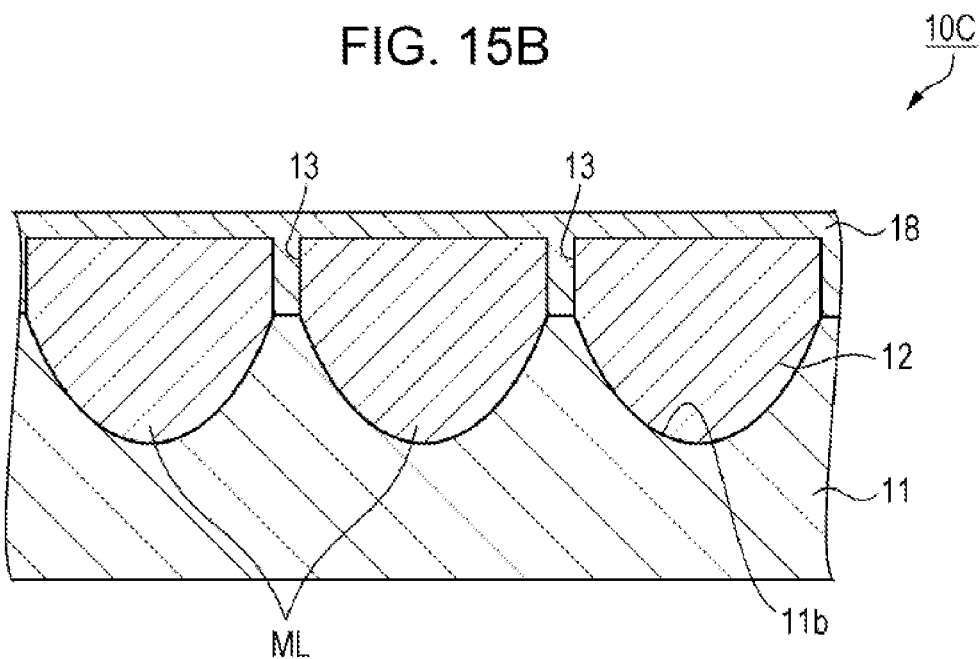

Next, a configuration of a micro lens array substrate according to a fourth embodiment is described. FIGS. 15A and 15B are schematic plan views, each illustrating the configuration of the micro lens array substrate according to the fourth embodiment. Specifically, FIG. 15A is a schematic cross-sectional view taken along a line A-A (X-direction) in FIGS. 5A and 5B, and FIG. 15B is a schematic cross-sectional view taken along a line B-B' (W-direction) in FIGS. 5A and 5B.

A micro lens array substrate 10C according to the fourth embodiment is different from the micro lens array substrate 10 according to the first embodiment in that a transparent layer 18 is provided on a lens layer 12, but the micro array substrates 10 and 10C are almost the same in the other configurations. Moreover, constituent elements common to the first embodiment are given like reference numerals, and their descriptions are omitted.

As illustrated in FIGS. 15A and 15B, in the micro lens array substrate 10C according to the fourth embodiment, the transparent layer 18 is provided on the lens layer 12, in such a manner as to fill in at least a through-hole 13. The transparent layer 18, for example, is provided in such a manner as to cover a region where a micro lens ML is arranged in the lens layer 12. The provision of the transparent layer 18 alleviates a height difference due to the through-hole 13 provided in the lens layer 12.

The transparent layer 18 has optical transparency and has almost the same refractive index as the lens layer 12. Then, the transparent layer 18 has higher heat resistance than the lens layer 12. For example, inorganic material, such as SiON or SiN, can be used as material of the transparent layer 18.

Method of Manufacturing Micro Lens Array Substrate

The method of manufacturing the micro lens array substrate 10C according to the fourth embodiment includes a process of forming the transparent layer 18 subsequent to the stripping process according to the first embodiment. Although not illustrated, in the process of forming the transparent layer 18, the transparent layer 18 is formed in such a manner as to fill in the through-hole 13 provided in the lens layer 12, for example, using a CVD method. Furthermore, in the process of forming transparent layer 18, the transparent layer 18 is formed on the lens layer 12 at a higher temperature than in the process of forming the lens layer 12.

According to the fourth embodiment, the following effects can be obtained.

(1) Because the transparent layer 18 is formed in such a manner as to fill in the through-hole 13 in the lens layer 12, the height difference of the surface of the lens layer 12 due to the through-hole 13 is alleviated. Accordingly, if a light blocking layer 22 or a wiring line is formed on a layer above the micro lens array substrate 10C, the light blocking layer 22 or the wiring line can be formed in a state where the light blocking layer 22 or the wiring line is stabilized.

(2) Because the transparent layer 18 has optical transparency and has almost the same refractive index as the lens layer 12, unnecessary reflection or scattering of light on an interface of the through-hole 13 is suppressed. This can suppress a decrease in transmittance of light incident on the micro lens array substrate 10C.

(3) Because the transparent layer 18 has higher heat resistance than the lens layer 12, although the micro lens array substrate 10C is exposed to temperature changes, such as high temperature heating or cooling, the crack in the lens layer 12 can be more suppressed.

Fifth Embodiment

Electronic Apparatus

Figure 16:
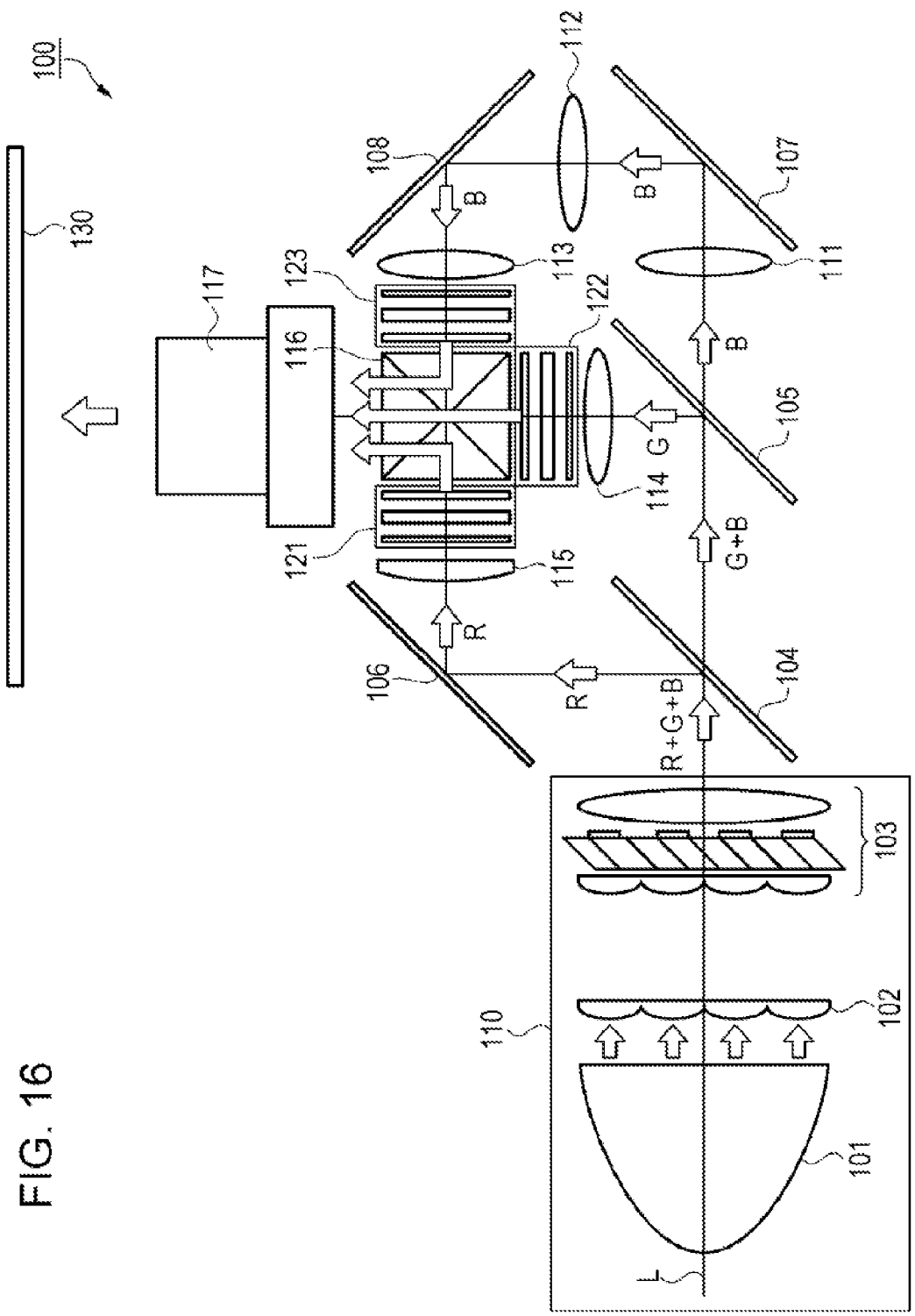
FIG. 16 is a schematic view illustrating a configuration of a projector as an electronic apparatus according to a fifth embodiment.

Next, an electronic apparatus according to a fifth embodiment is described referring to FIG. 16. FIG. 16 is a schematic view illustrating a configuration of a projector as the electronic apparatus according to the fifth embodiment.

As illustrated in FIG. 16, a projector 100 (projection type display apparatus) as the electronic apparatus according to the fifth embodiment includes a polarized-light emission device 110, two dichroic mirrors 104 and 105 as light separation elements, three reflection mirrors 106, 107, and 108, five relay lenses 111, 112, 113, 114, and 115, three liquid crystal light valves 121, 122, and 123, a cross dichroic prism 116 as a photosynthesis element, and a projection lens 117.

The polarized-light emission device 110, for example, includes a lamp unit 101 as a light source that is made from a white light source, such as an ultrahigh pressure mercury lamp, or a halogen lamp, an integrator lens 102, and a polarized-light conversion element 103. The lamp unit 101, the integrator lens 102, and the polarized-light conversion element 103 are arranged along a system optical axis L.

Among luminous flux of polarized light emitted from the polarized-light emission device 110, the dichroic mirror 104 reflects red color (R) and allows green light (G) and blue light (B) to pass through. The other dichroic mirror 105 reflects the green light (G) that passes through the dichroic mirror 104 and allows the blue light (B) to pass through.

After being reflected from the dichroic mirror 104, the red light (R) is reflected from the reflection mirror 106 and then enters the liquid crystal light valve 121 via the relay lens 115. After being reflected from the dichroic mirror 105, the green light (G) enters the liquid crystal light valve 122 via the relay lens 114. The blue light (B) that passes through the dichroic mirror 105 enters the liquid crystal light valve 123 via a light guide system that is configured from the three relay lens 111, 112, and 113 and the two reflection mirrors 107 and 108.

The liquid crystal light valves 121, 122, and 123 as light modulation elements are arranged in such a manner as to face toward surfaces of the cross dichroic prism 116 that color light enters, respectively. Light that is incident on the liquid crystal light valve 121, 122, and 123 is modulated, based on image information (an image signal) and is emitted toward the cross dichroic prism 116.

The cross dichroic prism 116 is configured from four right angle prisms that are attached to one another. A dielectric multilayer film that reflects red light and a dielectric multilayer film that reflects blue light are formed, in the shape of a cross, on the inside surface of the cross dichroic prism 116. Light of 3 colors is synthesized by the dielectric multilayer films and thus light representing a color image is synthesized. The synthesized light is projected on a screen 130 by the projector lens 117 which is a projection optical system, and the image is displayed in an enlarged manner.

The liquid crystal light valve 121 results from applying the liquid crystal device 1 that has the micro lens array substrates 10, 10A, 10B, and 10C according to the embodiments described above, respectively. The liquid crystal light valve 121 is arranged between a pair of polarization elements that are arranged in a crossed Nichol prism in the direction of incoming color light and in the direction of outgoing color light, with spacing in between. This is true also for the other liquid crystal light valves 122 and 123.

Because a projector 100 according to the fifth embodiment is configured to include the liquid crystal device 1 having the micro lens array substrates 10, 10A, 10B, and 10C that, although the multiple pixels P are arranged with a high resolution, are capable of efficiently using incident color light, the projector 100 can be provided that is high in quality and is bright in display.

Each of the embodiments described above exemplifies only one aspect of the present invention, and so, arbitrary modifications to the embodiment and arbitrary application of the embodiments are possible within a scope of the present invention. Modification examples are considered as follows.

Modification Example 1

The micro lens array substrate 10C according to the fourth embodiment has the configuration in which the transparent layer 18 is provided in such a manner as to fill in the through-hole 13 in the lens layer 12 on the micro lens array substrate 10 according to the first embodiment, but the present invention is not limited to this configuration. The transparent layer 18 may be provided in such a manner as to fill in the groove portion 14 or the concave portion 16 in the lens layer 12 on the micro lens array substrates 10A or 10B according to the second or third embodiments, respectively. With one such configuration, the same effect as with the fourth embodiment can be obtained.

Modification Example 2

According to each of the embodiments described above, each of the micro lens array substrates 10, 10A, 10B, and 10C is included in the element substrate 20 in the liquid crystal device 1, but the present invention is not limited to this configuration. For example, a configuration may be possible in which each of the micro lens array substrate 10, 10A, 10B and 10C is included in the opposite substrate 30. Furthermore, a configuration may be possible in which each of the micro lens array substrate 10, 10A, 10B, and 10C is included both in the element substrate 20 and in the opposite substrate 30. Moreover, if each of the micro lens array substrate 10, 10A, 10B, and 10C is provided in the opposite substrate 30, the discontinuous part that extends to the substrate 11, such as the through-hole 13, is arranged in the position that overlaps the light blocking layer 32 (refer to FIG. 3) when viewed from above.

Modification Example 3

According to each of the embodiments described above, the discontinuous part provided in the lens layer 12 of each of the micro lens array substrates 10, 10A, 10B, and 10C, which the extends to the substrate 11, such as the through-hole 13, is provided in every space between two adjacent micro lenses ML in the W-direction (direction of the line B-B'), but the present invention is not limited to this configuration. For example, the discontinuous part, such as the through-hole 13, may be provided in every two spaces between two adjacent micro lenses ML or every three spaces between two adjacent micro lenses ML in the W-direction (direction of the line B-B').

Modification Example 4

According to the embodiments described above, the micro lens ML (concave portion 11b in the substrate 11) is, for example, in the almost-hemisphere shape when viewed from the front, but the present invention is not limited to this configuration. The micro lens ML (concave portion 11b in the substrate 11) may be V-shaped or differently shaped when viewed from the front.

Modification Example 5

According to each of the embodiments described above, the configuration is provided in which one micro lens ML is arranged in each of the micro lens array substrate 10, 10A, 10B, and 10C, corresponding to one pixel P, but the present invention is not limited to this configuration. For example, if three pixels P, that is, red color (R), green color (G), and blue color (B), are defined as one unit when forming an image, a configuration may be possible in which one micro lens ML is provided corresponding to the three pixels P, that is, red color (R), green color (G), and blue color (B).

Modification Example 6

According to each of the embodiments described above, the configuration is provided in which the micro lenses ML (concave portion 11b in the substrate 11) are arranged in the shape of a matrix in each of the micro lens array substrate 10, 10A, 10B, and 10C, but the present invention is not limited to this configuration. The micro lenses ML may be arranged, for example, in the shape of a honeycomb or may be differently arranged corresponding to the arrangement of the pixels P.

Modification Example 7

An electronic apparatus to which the liquid crystal device 1 according to each of the embodiments described above can be applied is not limited to the projector 100. For example, the liquid crystal device 1 can be suitably used as a display unit of an information terminal, such as a projection type HUD (a head-up display), a direct-view type HMD (a Head-mounted display), an electronic book, a personal computer, a digital still camera, a liquid crystal television, a view finder type or monitor direct view type video recorder, a car navigation system, an electronic organizer, and a POS.

What is claimed is:

1. A micro lens array substrate comprising:
    a substrate having optical transparency, the substrate having a plurality of concave portions arranged in a first direction and a second direction intersecting the first direction on one surface of the substrate; and
    a lens layer having optical transparency, the lens layer having a different refractive index from that of the substrate, and the lens layer being formed on the one surface of the substrate so as to fill in the plurality of concave portions and to cover a region where the plurality of concave portions is formed,
    wherein the plurality of concave portions is arranged so as to be continuous in at least one of the first direction and the second direction,
    wherein the plurality of concave portions is arranged so as to have a discontinuous part in the lens layer between two adjacent concave portions of the plurality of concave portions in a third direction, the third direction intersecting the first direction and the second direction, and
    wherein a first depth of a center of one concave portion of the plurality of concave portions from the discontinuous part is greater than a second depth of the discontinuous part from a surface of the lens layer.

2. The micro lens array substrate according to claim 1, wherein
    a third depth of the lens layer at a border between the two adjacent concave portions from the surface of the lens layer is greater than a fourth depth of a center of one concave portion from the border between the two adjacent concave portions.

3. The micro lens array substrate according to claim 1, further comprising:
    a transistor having a channel region that is provided over the one surface of the substrate; and
    a light blocking layer that is provided between the lens layer and the transistor so as to overlap at least the channel region of the transistor when viewed in plan view,
    wherein the discontinuous part is provided so as to overlap the light blocking layer when viewed in plan view.

4. The micro lens array substrate according to claim 1, wherein the lens layer has a through-hole in the discontinuous part, when viewed in plan view, the through-hole extending to the substrate.

5. The micro lens array substrate according to claim 1, wherein the lens layer includes a groove portion between two adjacent concave portions of the plurality of concave portions, a part of the groove portion extending to the substrate in the discontinuous part when viewed in plan view.

6. The micro lens array substrate according to claim 4, further comprising:
    a transparent layer having optical transparency, wherein
        the transparent layer is formed so as to fill in the through-hole,
        the transparent layer is formed so as to have a same refractive index as the lens layer, and
        a heat resistance of the transparent layer is higher than a heat resistance of the lens layer.

7. An electro-optical device comprising:
the micro lens array substrate according to claim 1.

8. An electronic apparatus comprising:
the electro-optical device according to claim 7.

9. The micro lens array substrate according to claim 5, further comprising:
a transparent layer having optical transparency,
wherein
the transparent layer is formed so as to fill in the groove portion,
the transparent layer is formed so as to have a same refractive index as the lens layer, and
a heat resistance of the transparent layer is higher than a heat resistance of the lens layer.

* * * * *